United States Patent
Engerman et al.

(10) Patent No.: US 11,236,804 B2
(45) Date of Patent: Feb. 1, 2022

(54) ELECTRIC DRIVE AXLE SYSTEM WITH REMOVABLE PLANETARY GEAR ASSEMBLY

(71) Applicant: Dana Automotive Systems Group, LLC, Maumee, OH (US)

(72) Inventors: Eric M. Engerman, Novi, MI (US); Mitchell R. Lawson, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 93 days.

(21) Appl. No.: 16/794,643

(22) Filed: Feb. 19, 2020

(65) Prior Publication Data

US 2021/0254686 A1    Aug. 19, 2021

(51) Int. Cl.
| F16H 48/08 | (2006.01) |
| B60K 17/04 | (2006.01) |
| B60K 6/26 | (2007.10) |
| F16H 1/46 | (2006.01) |
| B60K 7/00 | (2006.01) |
| B60K 6/365 | (2007.10) |

(52) U.S. Cl.
CPC ............... *F16H 1/46* (2013.01); *F16H 48/08* (2013.01); *B60K 6/26* (2013.01); *B60K 6/365* (2013.01); *B60K 7/0007* (2013.01); *B60K 17/046* (2013.01); *B60Y 2200/92* (2013.01); *F16H 2200/0021* (2013.01); *F16H 2200/2007* (2013.01)

(58) Field of Classification Search
CPC . F16H 3/72; F16H 3/724; F16H 3/725; F16H 2200/2007–2200/2017; B60K 17/08; B60K 17/16; B60K 17/165; B60K 1/00; B60K 2001/001
See application file for complete search history.

(56) References Cited

U.S. PATENT DOCUMENTS

| 8,651,991 | B1* | 2/2014 | Sten | ........................ F16H 48/30 475/150 |
| 2004/0185983 | A1* | 9/2004 | Chung | ..................... F16H 48/08 475/231 |
| 2010/0029428 | A1* | 2/2010 | Abe | ........................ B60K 6/365 475/5 |
| 2013/0203543 | A1* | 8/2013 | Sten | ........................ F16H 48/36 475/150 |

(Continued)

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.

(Continued)

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems for an electric drive axle of a vehicle are provided. An electric drive axle system includes, in one example, a gear train configured to rotationally attach to an electric motor-generator. The gear train includes an output shaft rotationally coupled to a first planetary gear assembly axially offset from an input shaft rotationally coupled to the electric motor-generator, the first planetary gear assembly configured to removably couple to a differential arranged co-axial with an axle.

18 Claims, 14 Drawing Sheets

(56) References Cited

U.S. PATENT DOCUMENTS

2014/0274528 A1* 9/2014 Valente .................. G01N 30/74
 475/150

OTHER PUBLICATIONS

Engerman, E., "Electric Drive Axle System With Multi-Speed Gear Train," U.S. Appl. No. 16/794,632, filed Feb. 19, 2020, 37 pages.
Nahrwold, T., "Dig Mode System and Method for Vehicle," U.S. Appl. No. 16/794,618, filed Feb. 19, 2020, 36 pages.
Nahrwold, T., "Sand Mode System and Method for a Vehicle," U.S. Appl. No. 16/794,647, filed Feb. 19, 2020, 33 pages.
Engerman, E., "Electric Drive Axle Gear Train and Method for Manufacturing Said Gear Train," U.S. Appl. No. 16/794,654, filed Feb. 19, 2020, 48 pages.
Wesolowski, S. et al., "System and Method for Characterizing a Clutch," U.S. Appl. No. 16/794,675, filed Feb. 19, 2020, 43 pages.
Nahrwold, T. et al., "Systems and Method for Adjusting Vehicle Performance," U.S. Appl. No. 16/794,783, filed Feb. 19, 2020, 34 pages.
Engerman, E., "Vehicle System With Multiple Electric Drive Axles," U.S. Appl. No. 16/795,263, filed Feb. 19, 2020, 43 pages.
Engerman, E., "Electric Drive Axle With Lubrication System," U.S. Appl. No. 16/795,280, filed Feb. 19, 2020, 47 pages.

* cited by examiner

ELECTRIC DRIVE AXLE SYSTEM WITH REMOVABLE PLANETARY GEAR ASSEMBLY

FIELD

The present disclosure relates to electric drive axles in vehicles, and more particularly to a removable planetary gear assemblies in drive axle gear trains.

BACKGROUND

Electrified axles have been incorporated into electric as well as hybrid vehicles to provide or augment vehicle propulsion. The electrified axles have included gearboxes acting to provide a desired gear ratio for rotational energy transfer between the electric motor and the drive wheels. However, the inventors have recognized that previous electric drive axles have exhibited drawbacks related to axle packaging and gearbox access. The gearbox access issues may present impediments to an end-user's ability to alter the drive ratio (e.g., the final drive ratio) of the vehicle. In conventional rear axles, hypoid gear sets coupled to differentials have been used as final stage gears. However, swapping gear sets in parallel axis gear arrangements poses additional challenges in comparison to hypoid gear arrangements. The difficulties in gear removal and replacement in parallel axis arrangements may stem from, for example, the architecture of the housing enclosing the parallel axis gears as well as the fixed center distance in the housing between gear, in certain cases. Gearboxes with other types of planetary gear arrangements have also presented gearing accessibility issues in previous electrified drive axles. For instance, certain electrified drive axle systems use multiple planetary gear sets positioned upstream of the final stage of gearing. As such, accessing and disassembling multi-planetary gearboxes may be very laborious and time consuming.

SUMMARY

To overcome at least some of the aforementioned drawbacks, an electric drive axle system is provided. In one example, the electric drive axle system includes a gear train configured to rotationally attach to an electric motor-generator. The gear train includes an output shaft rotationally coupled to a first planetary gear assembly axially offset from an input shaft rotationally coupled to the electric motor-generator. Additionally, the first planetary gear assembly is configured to removably couple to a differential is co-axial with an axle. In this way, the planetary gear assembly in the drive axle may be made more accessible, when compared to gearboxes using hypoid gear arrangements.

In another example, the differential may include an attachment interface designed to couple to an attachment interface in the first planetary gear assembly as well as an attachment interface in a second planetary gear assembly with a different gear ratio than the first planetary gear assembly. In this way, the system's architecture enables efficient end-user planetary gear removal and replacement, if desired.

In yet another example, the planetary gear assembly may include a plurality of planet pins axially extending through a planetary carrier in the first planetary gear assembly and into recesses in a case of the differential. This planet pin arrangement allows alignment between the planetary gear assembly and the differential to be efficiently carried out during gear train assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-22 are drawn approximately to scale. However, other relative dimensions of the components may be used in other embodiments.

DETAILED DESCRIPTION

An electric drive axle system with a planetary gear assembly facilitating rapid gear ratio swapping in a gearbox, is described herein. To achieve the gear swapping efficiency, the system includes, in one example, a differential with an attachment interface designed to attach to multiple planetary gear assemblies with different ratios at different times. The attachment interface may be included in a differential case and, when assembled with a planetary assembly, may be coupled directly to an interface in the planetary assembly. The pattern of the attachment openings in the interfaces in the different planetary arrangements may be substantially identical to allow for simplified planetary gear assembly replacement for gear train ratio adjustment. In another example, the planetary gear assemblies may include planet pins extending through carriers and serving as datums for aligning the differential and the planetary assembly. The planetary gear assemblies with different ratios may therefore be efficiently aligned with the differential during installation of the planetary gears. In yet another example, the system may include a clutch designed to activate and deactivate a gear set upstream of the planetary gear assembly in the gearbox. When activate the clutch exerts an axial force on an output shaft of the gearbox. The planetary gear assembly, in such an example, may be designed to exert an axial force on the output shaft at least partially counteracting the clutch force. In this way, the longevity of the bearings coupled to the output shaft may be extended, if desired.

Figure 1:
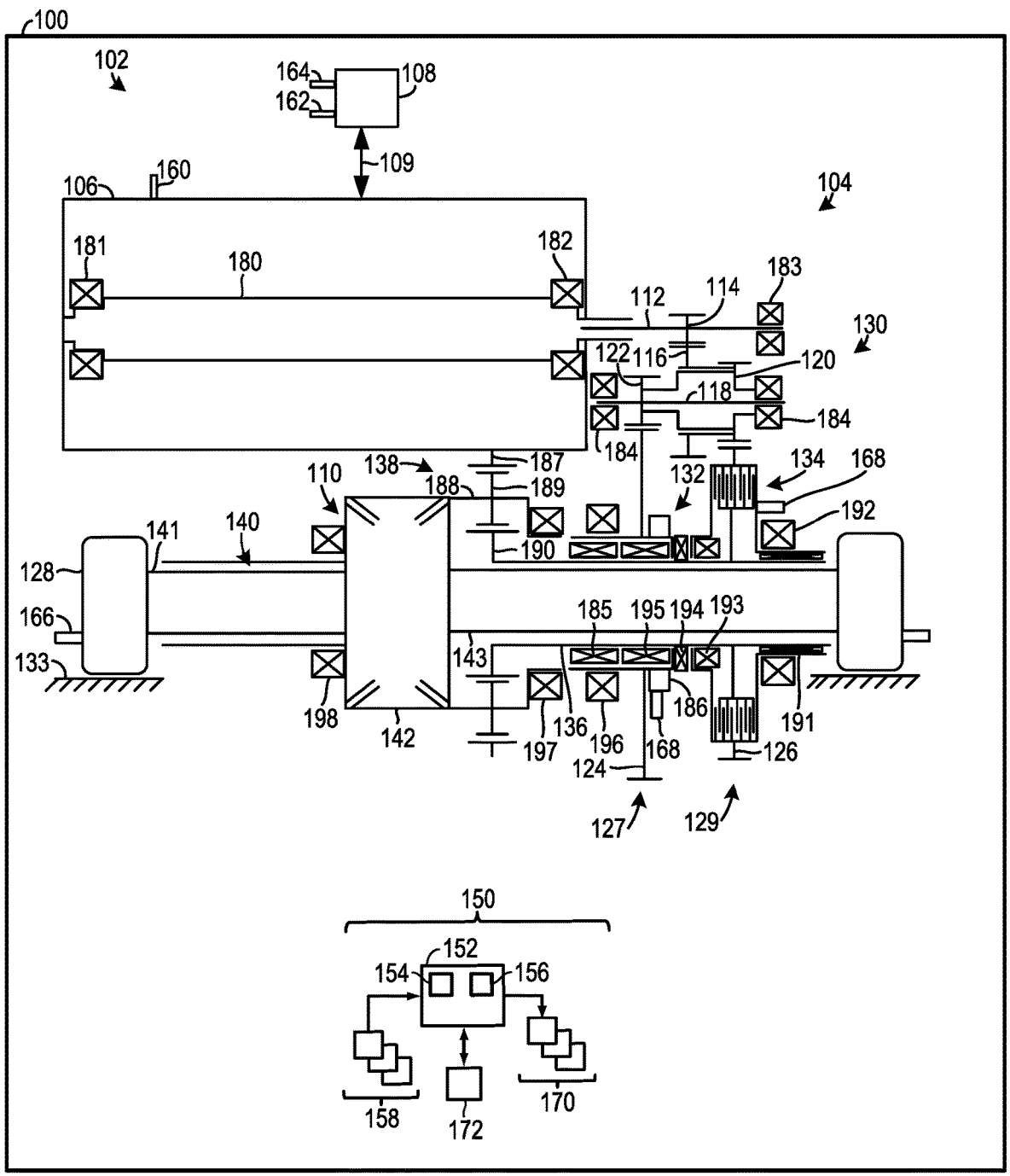
FIG. 1 is a schematic representation of a vehicle including an electric drive axle system.
Figure 2:
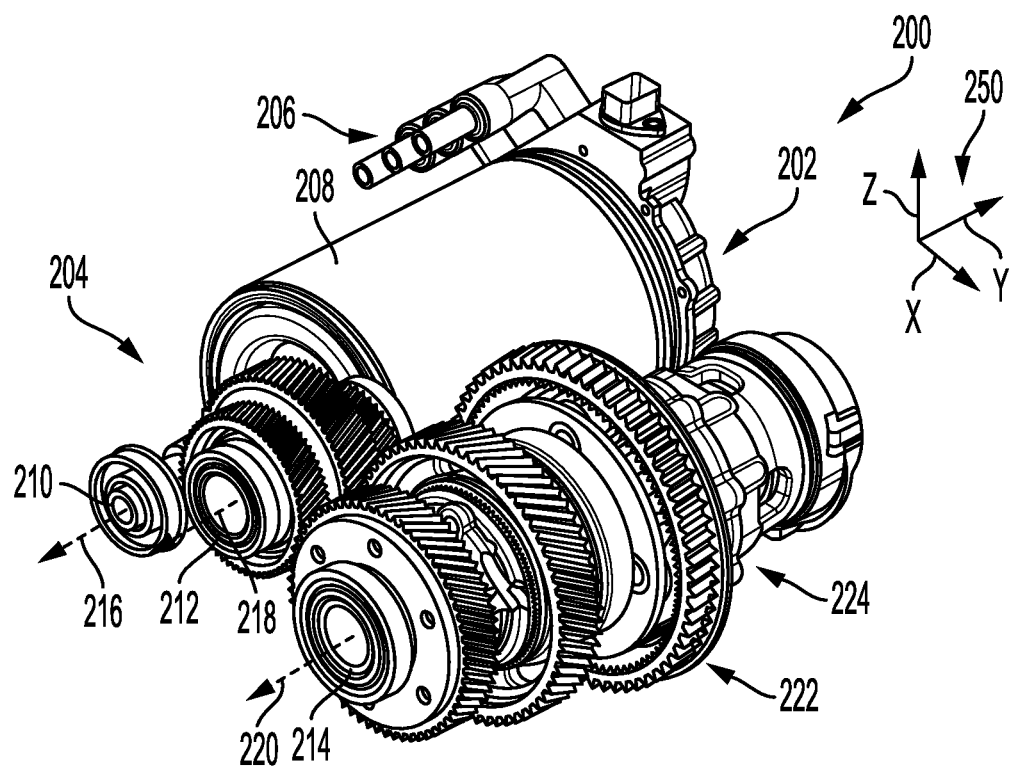
FIG. 2 shows a perspective view of an example of an electric drive axle system with a gear train having multiple selectable gear sets.
Figure 3:
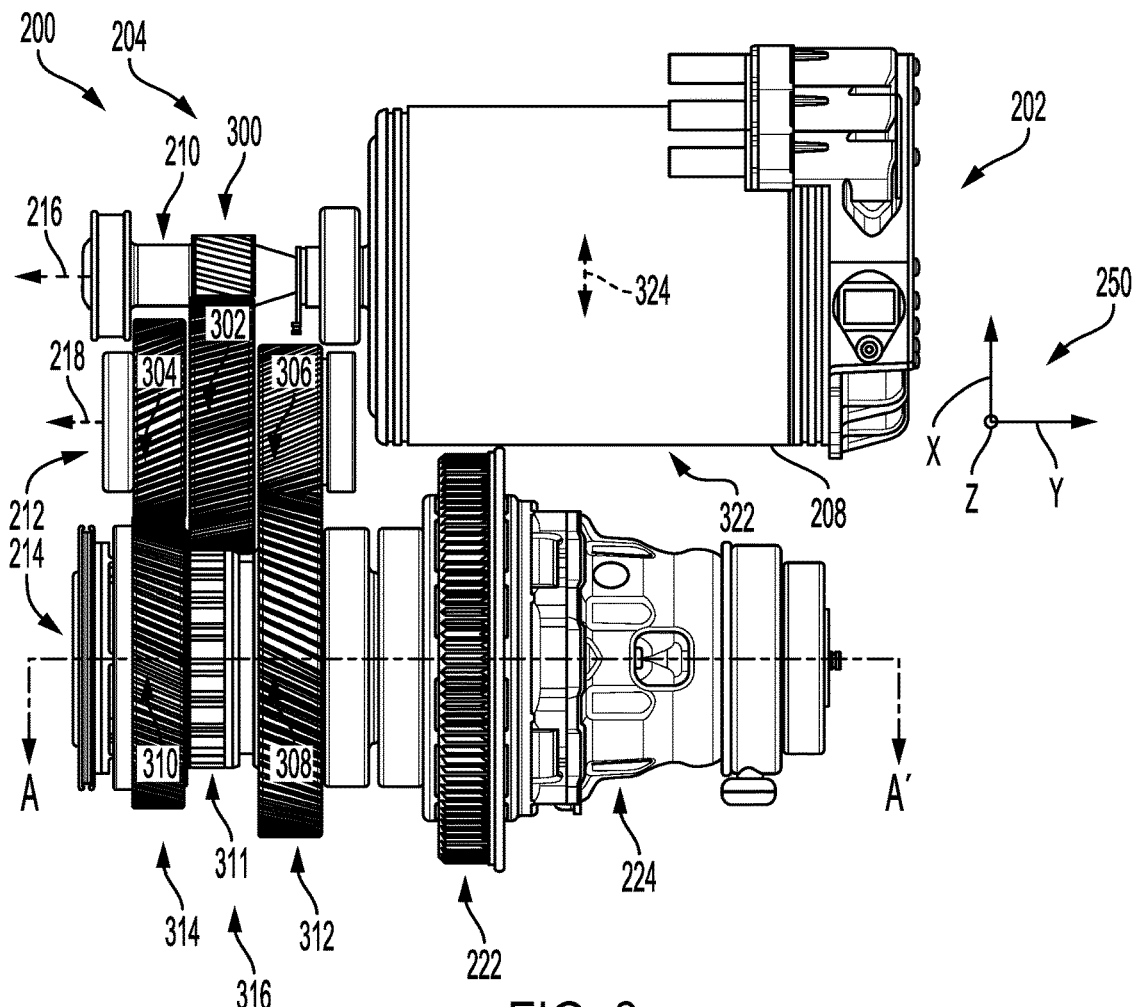
FIG. 3 shows a top view of the electric drive axle system, depicted in FIG. 2.
Figure 4:
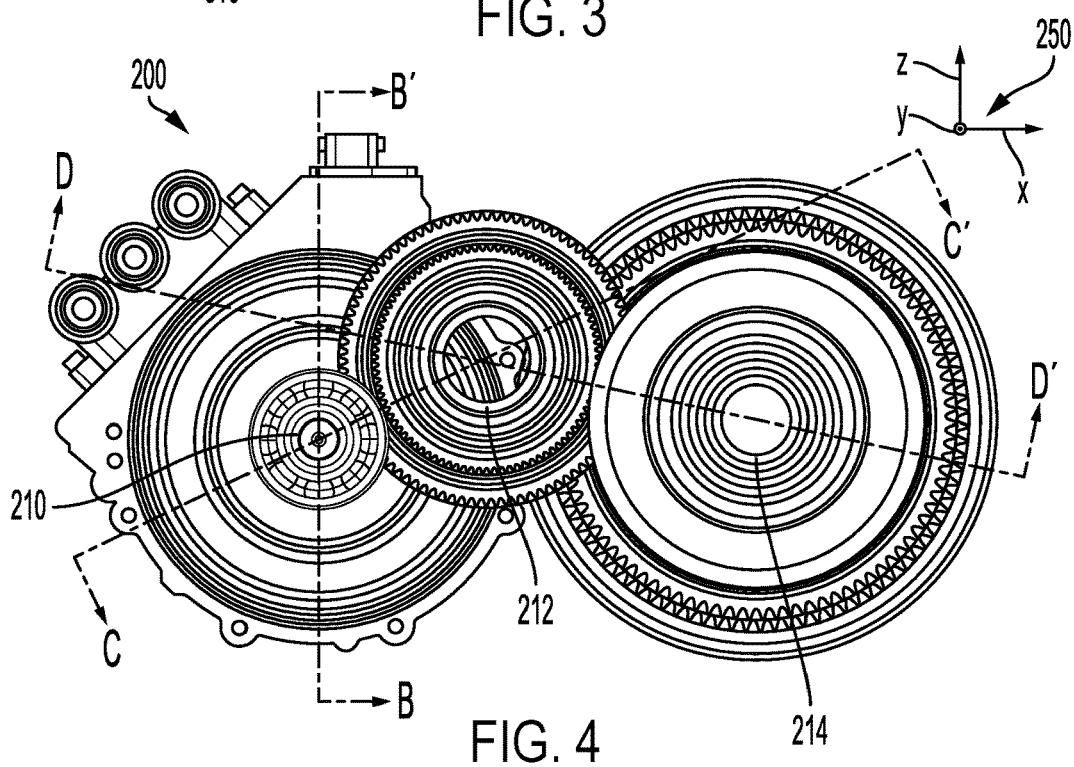
FIG. 4 shows a side view of the electric drive axle system, depicted in FIG. 2.
Figure 5:
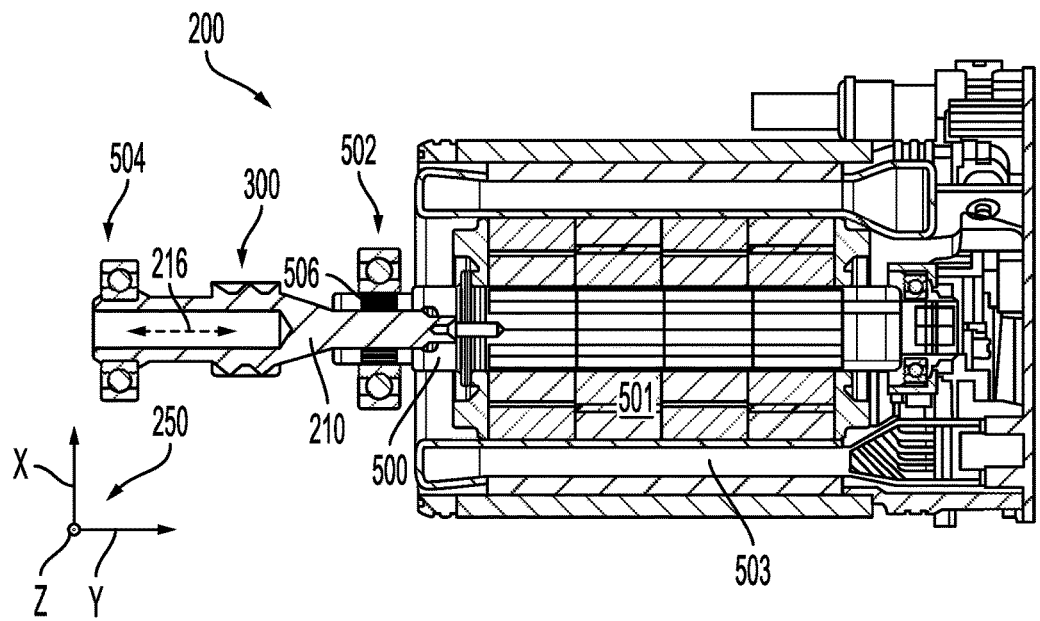
FIG. 5 shows a cross-sectional view of an electric motor-generator and input shaft in the electric drive axle system, depicted in FIG. 2.
Figure 6:
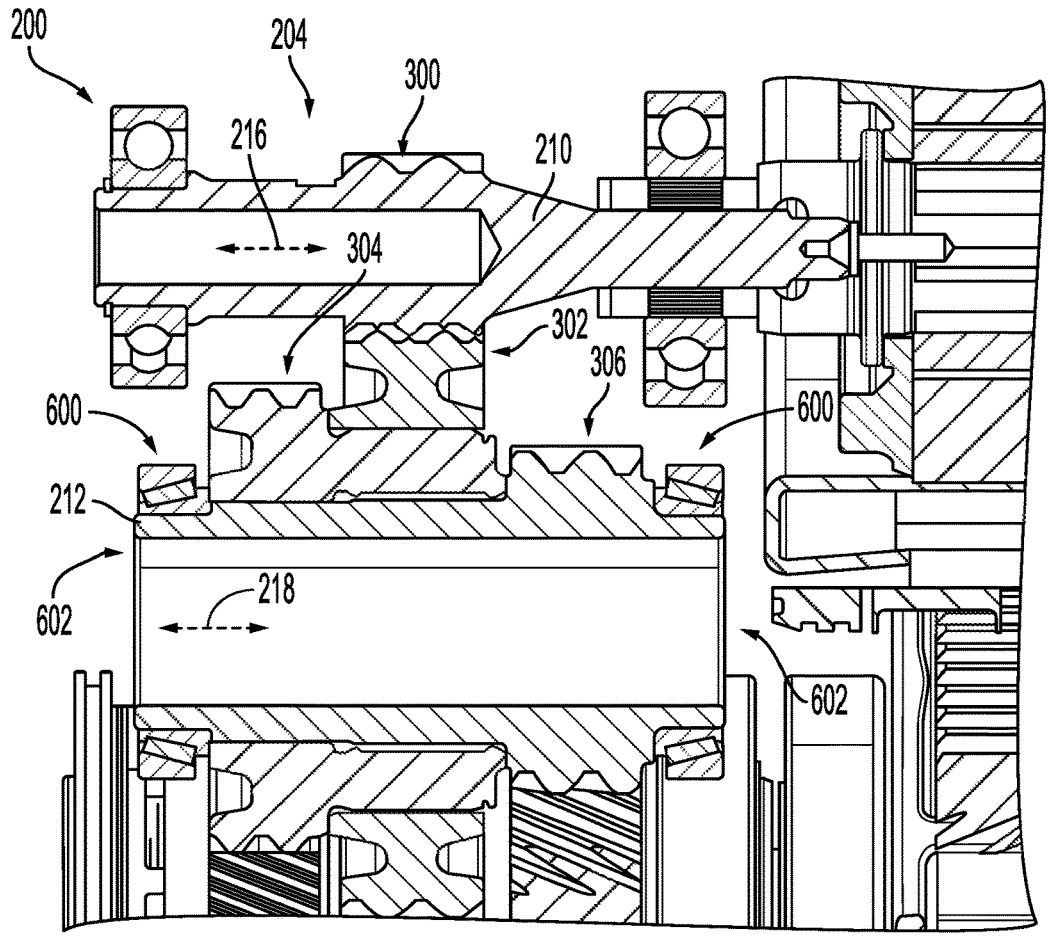
FIG. 6 shows a cross-sectional view of an intermediate shaft in the gear train of the electric drive axle system, depicted in FIG. 2.
Figure 7:
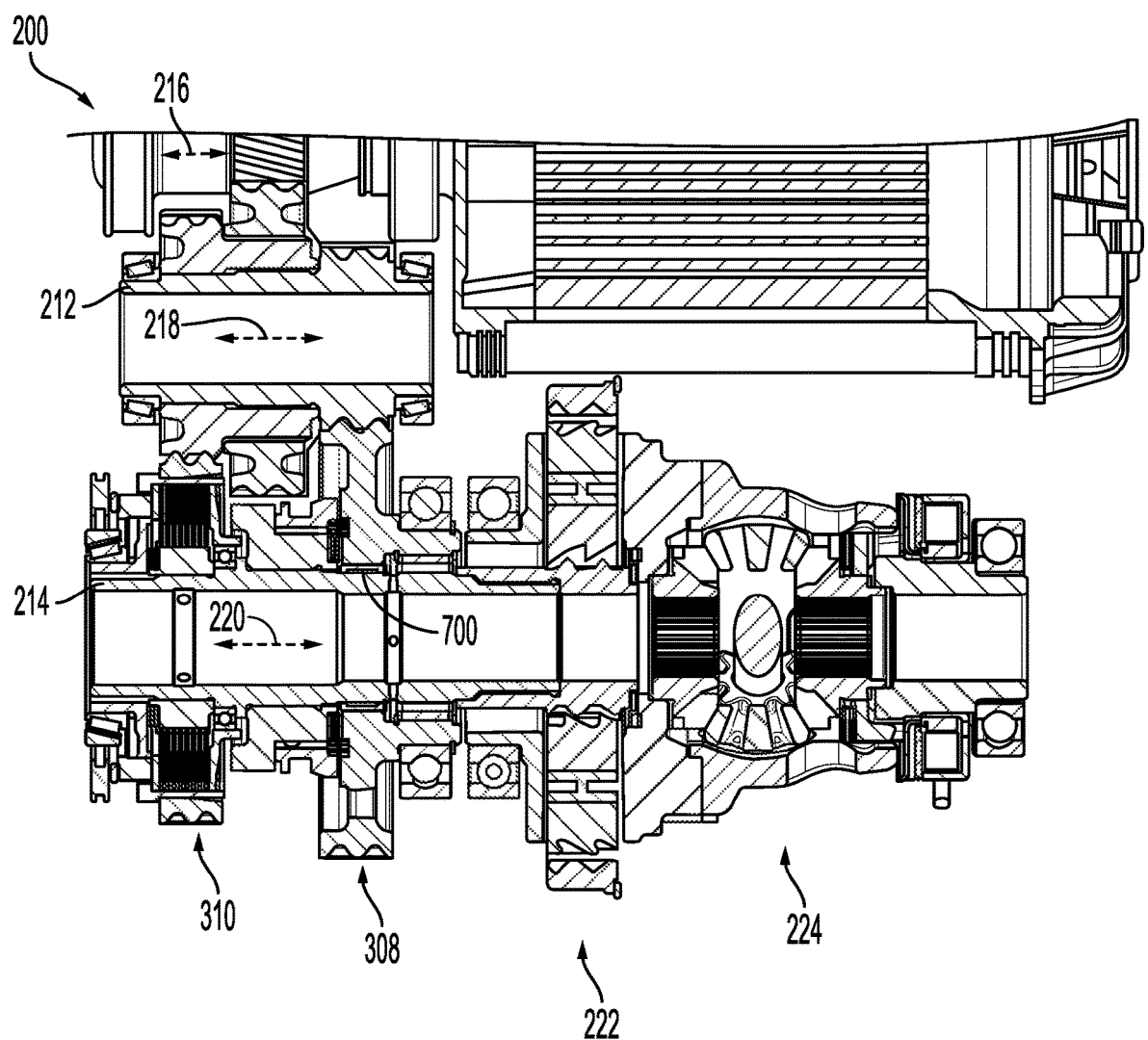
FIG. 7 shows a cross-sectional view of an output shaft, gear assembly, and differential in the gear train of the electric drive axle system, depicted in FIG. 2.
Figure 8:
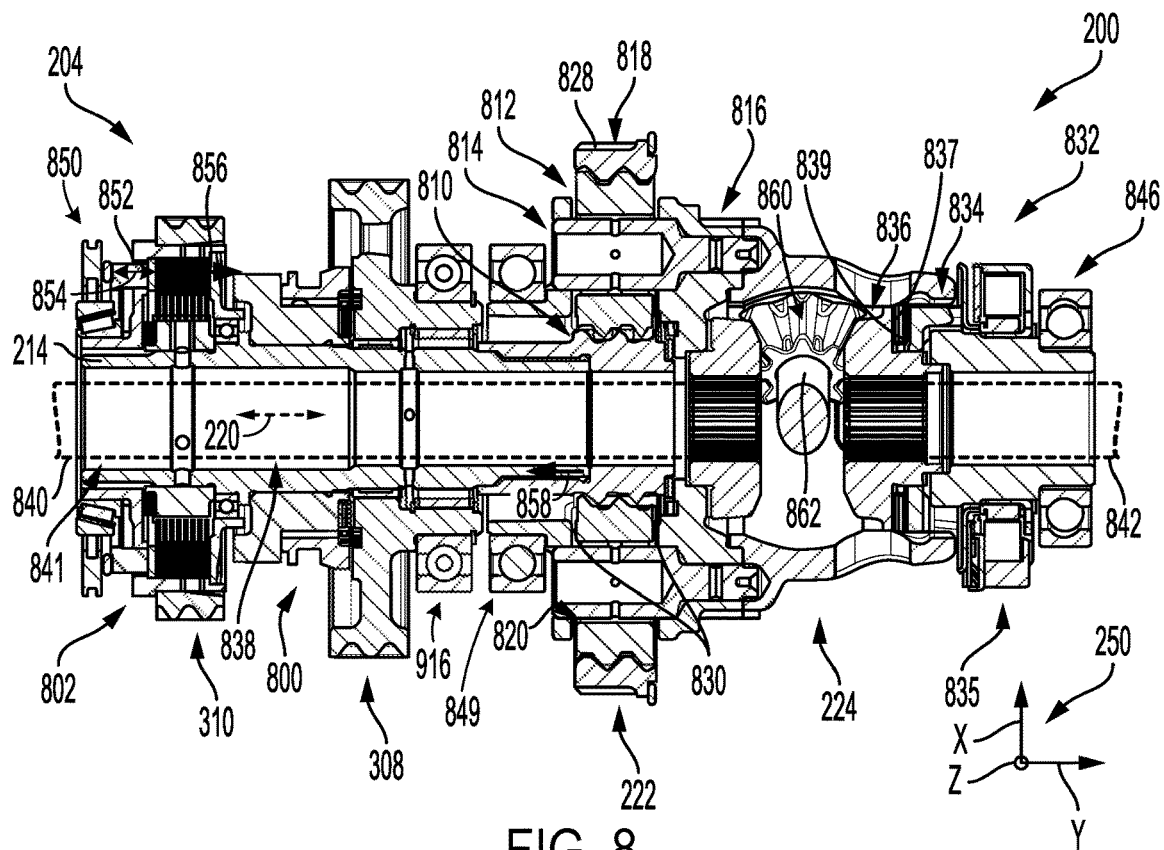
FIG. 8 shows a more detailed view of the output shaft, gear assembly, and differential in the gear train of the electric drive axle system, depicted in FIG. 2.
Figure 9:
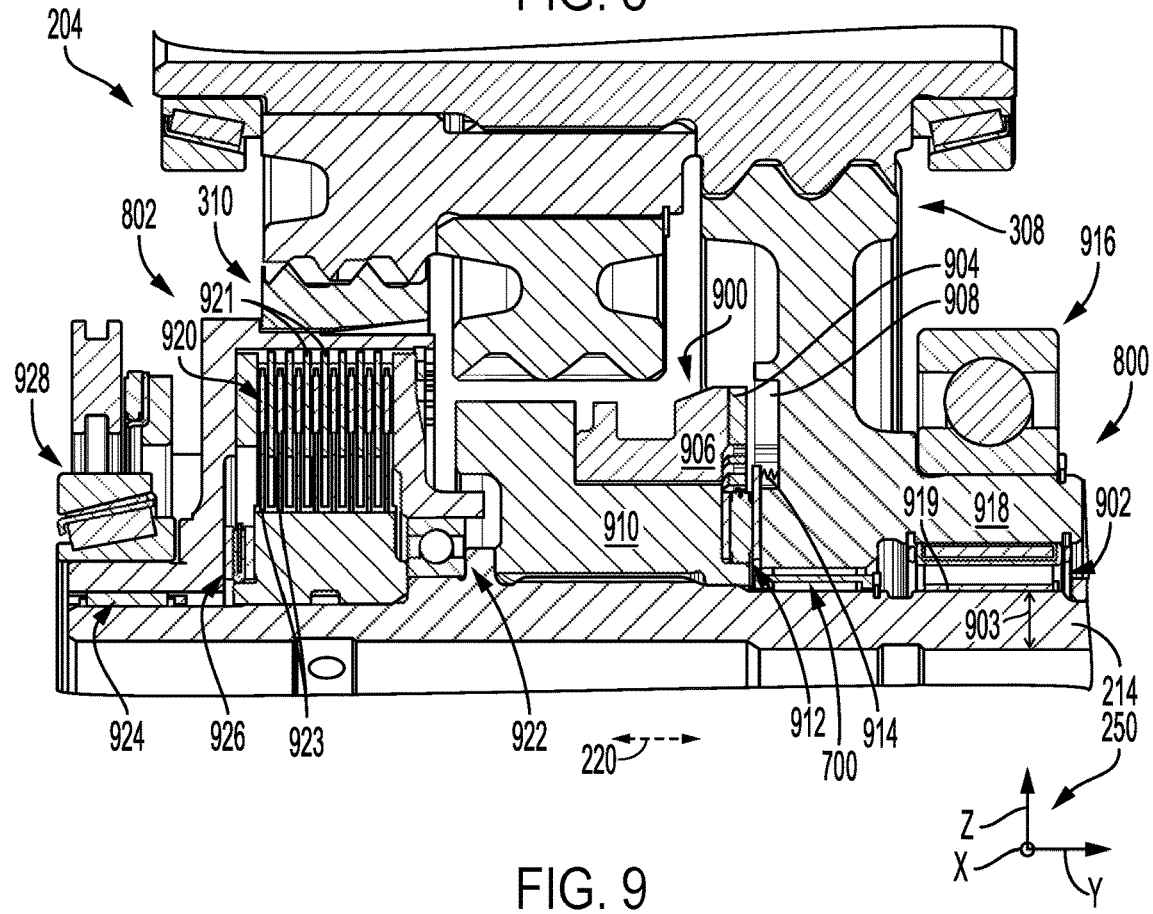
FIG. 9 shows a more detailed view of the clutch assemblies in the gear train of the electric drive axle system, depicted in FIG. 2.
Figure 10:
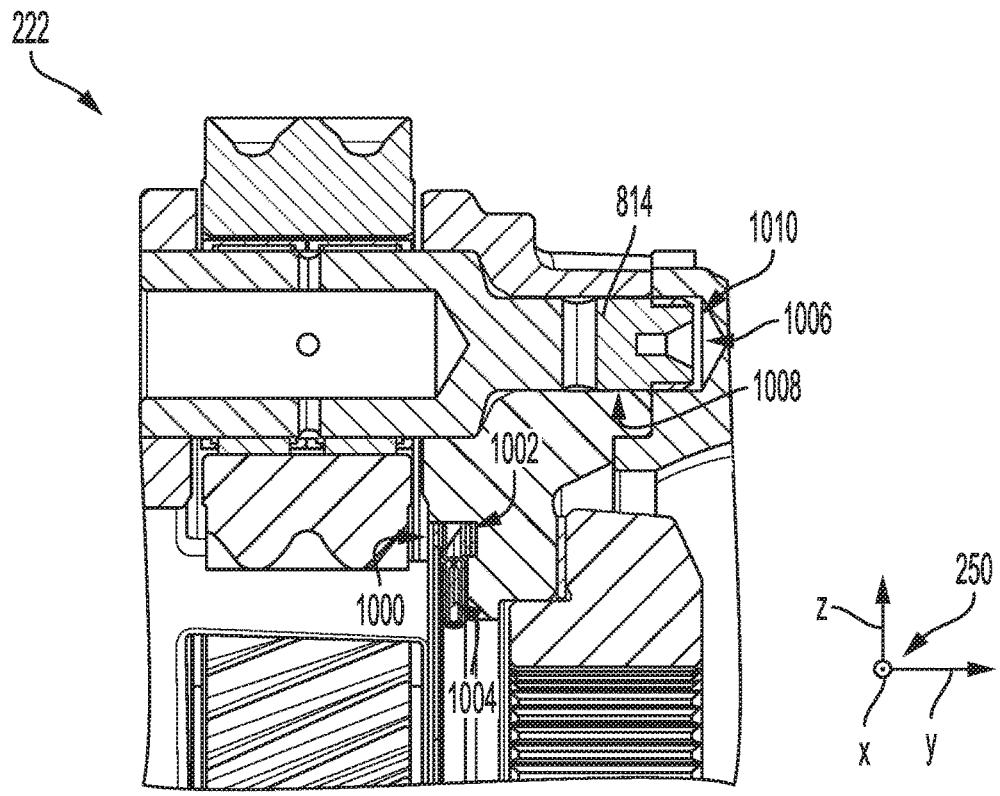
FIGS. 10-12 show detailed views of different sections of the planetary gear assembly in the gear train of the electric drive axle system, depicted in FIG. 2.
Figure 11:
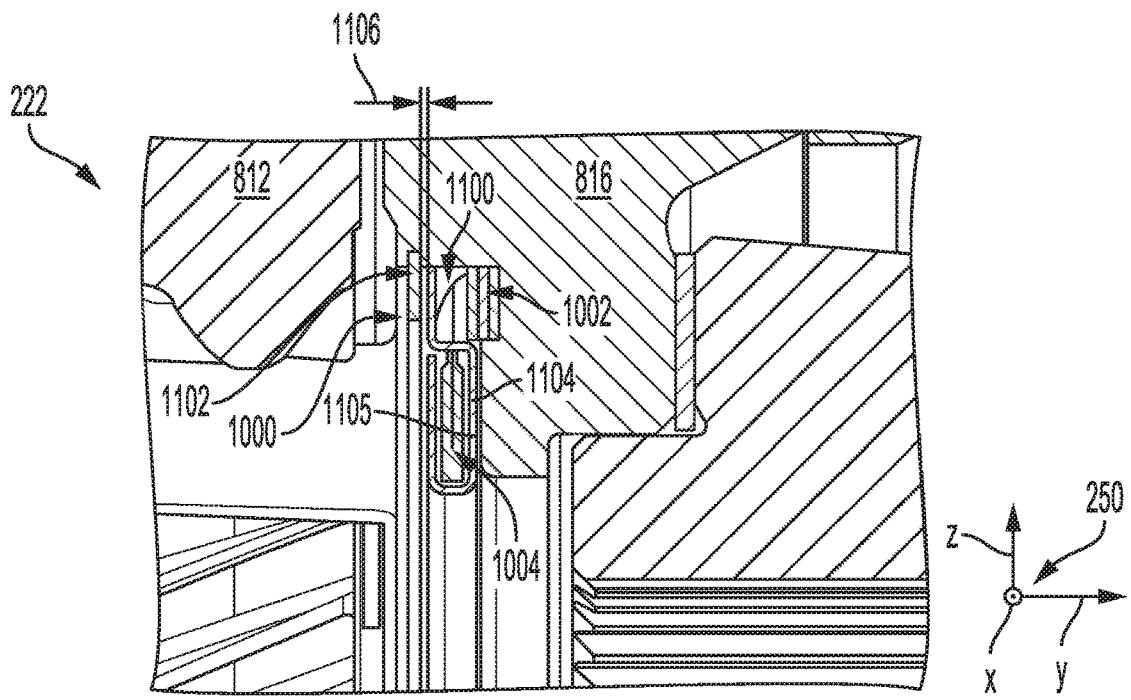
Figure 12:
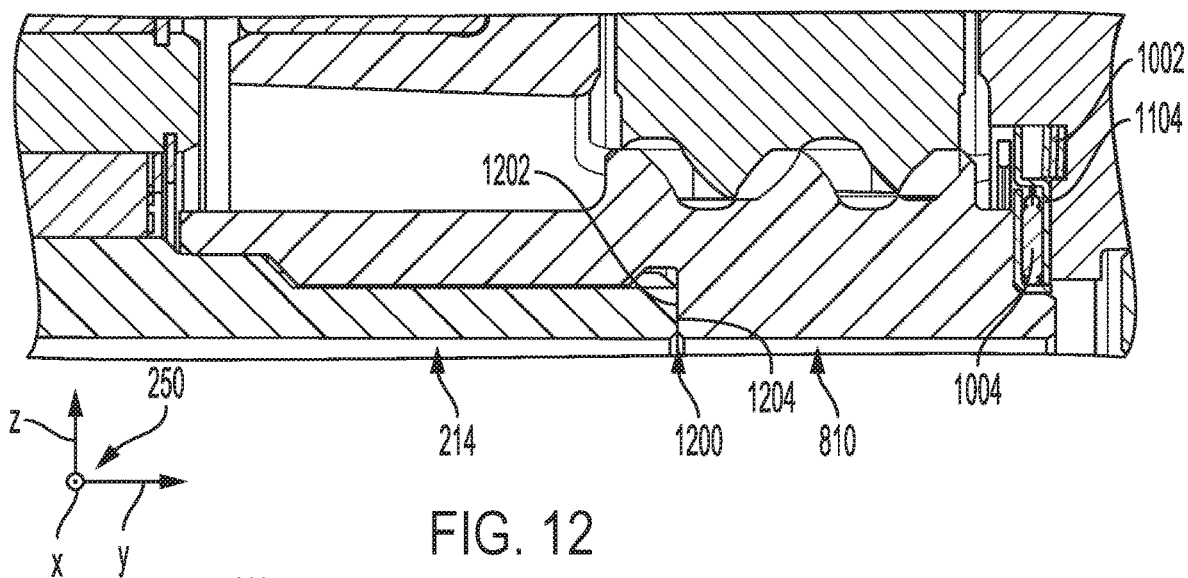
Figure 17:
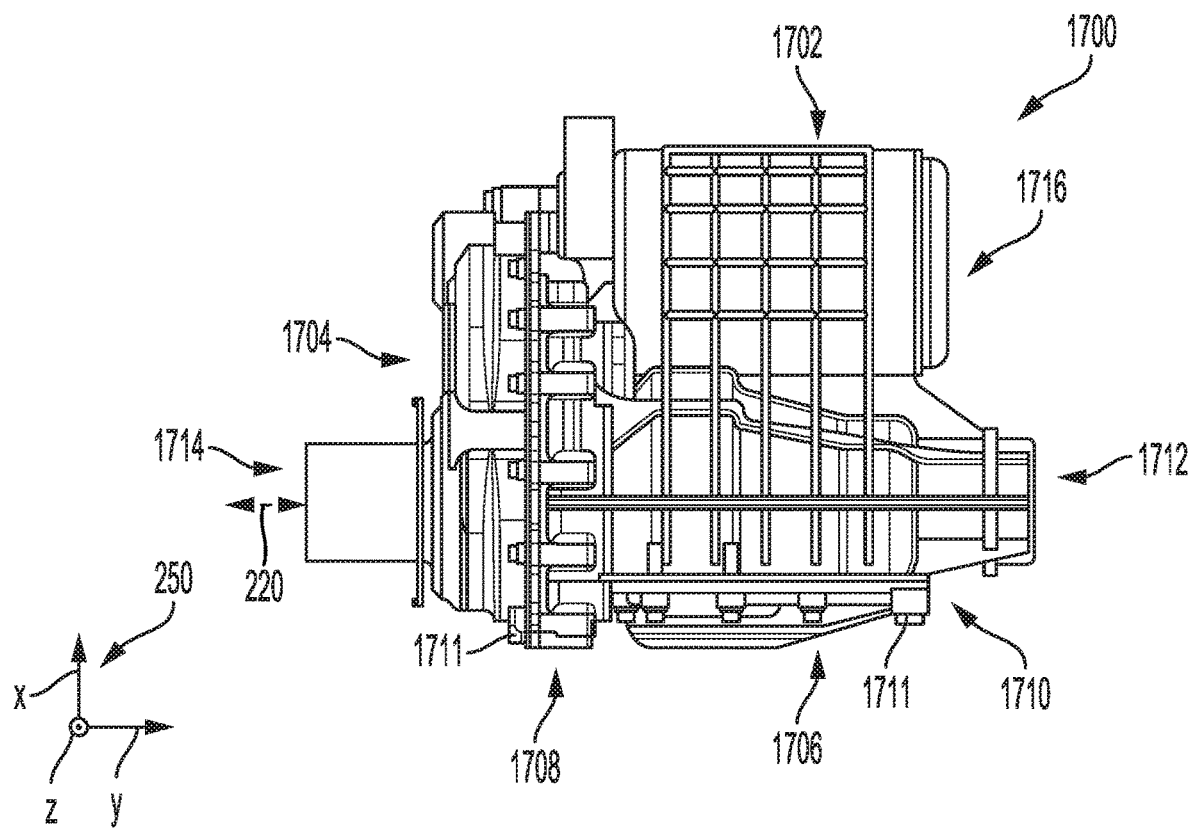
FIG. 17 shows an example of a housing in the electric drive axle system, shown in FIG. 2.
Figure 18:
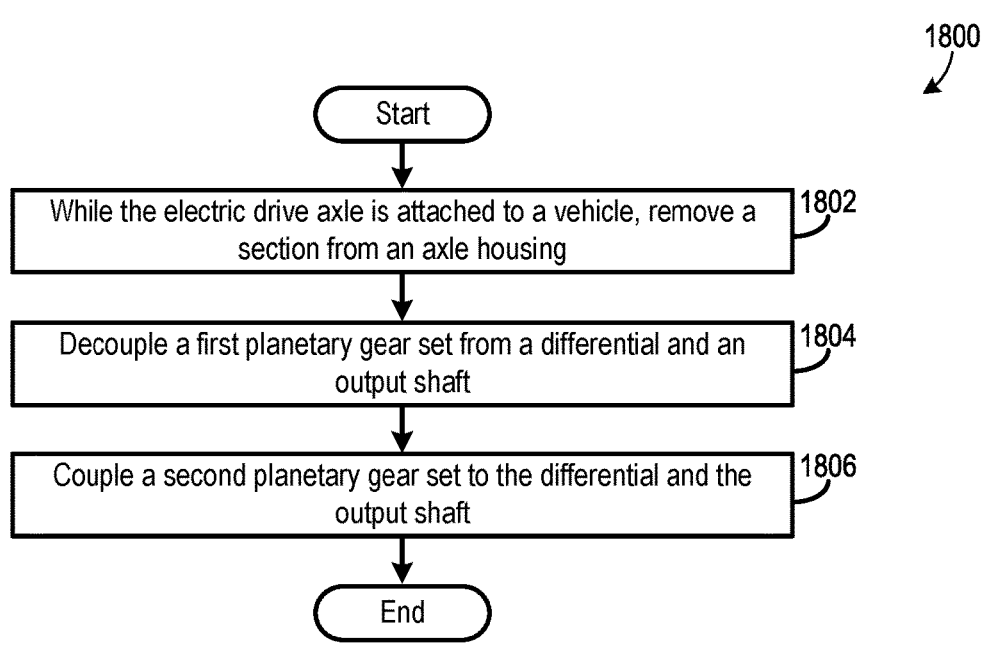
FIG. 18 shows a method for swapping planetary gear sets in an electric drive axle system.
Figure 19:
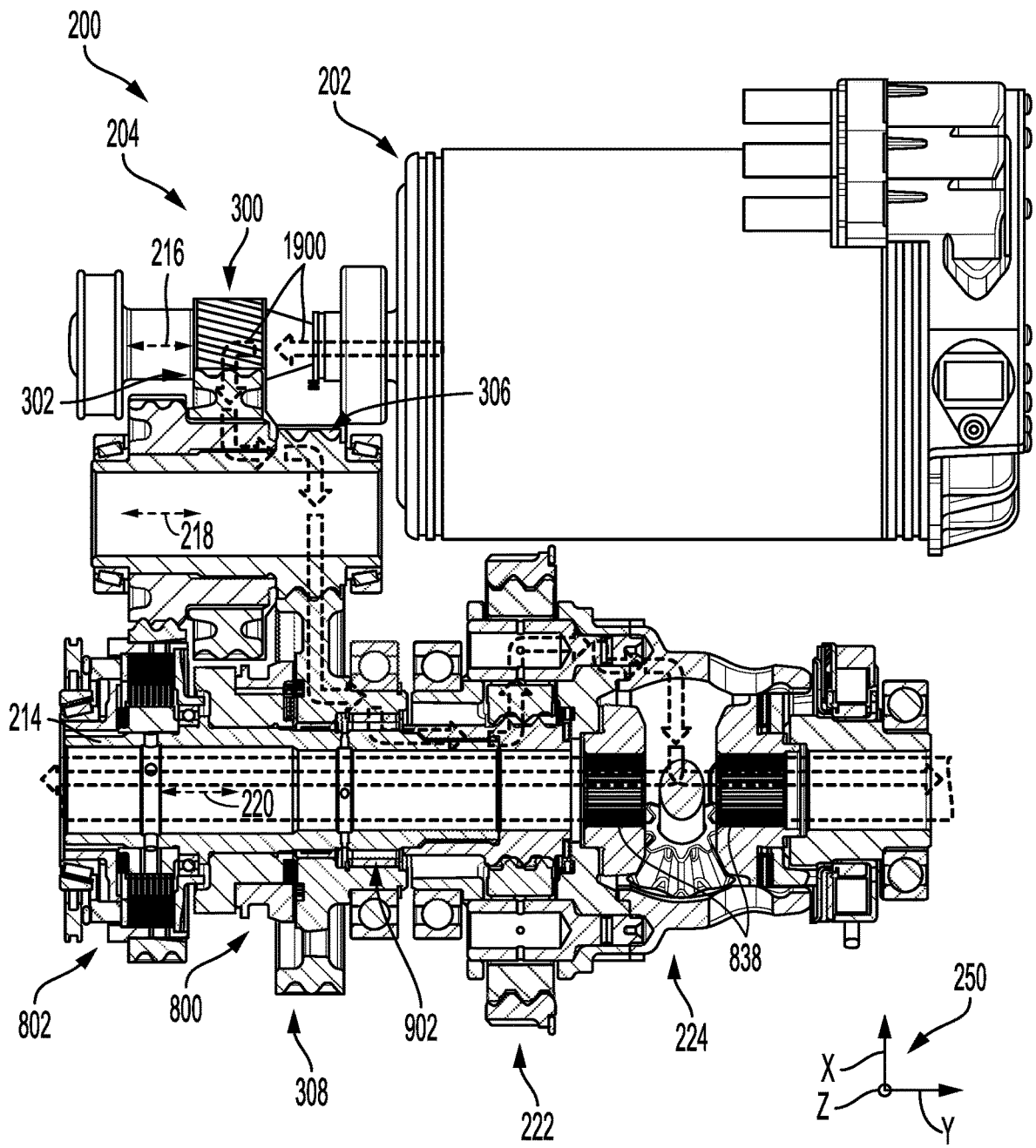
FIGS. 19-21 show power paths for different operating modalities of the electric drive axle system, shown in FIG. 2.
Figure 20:
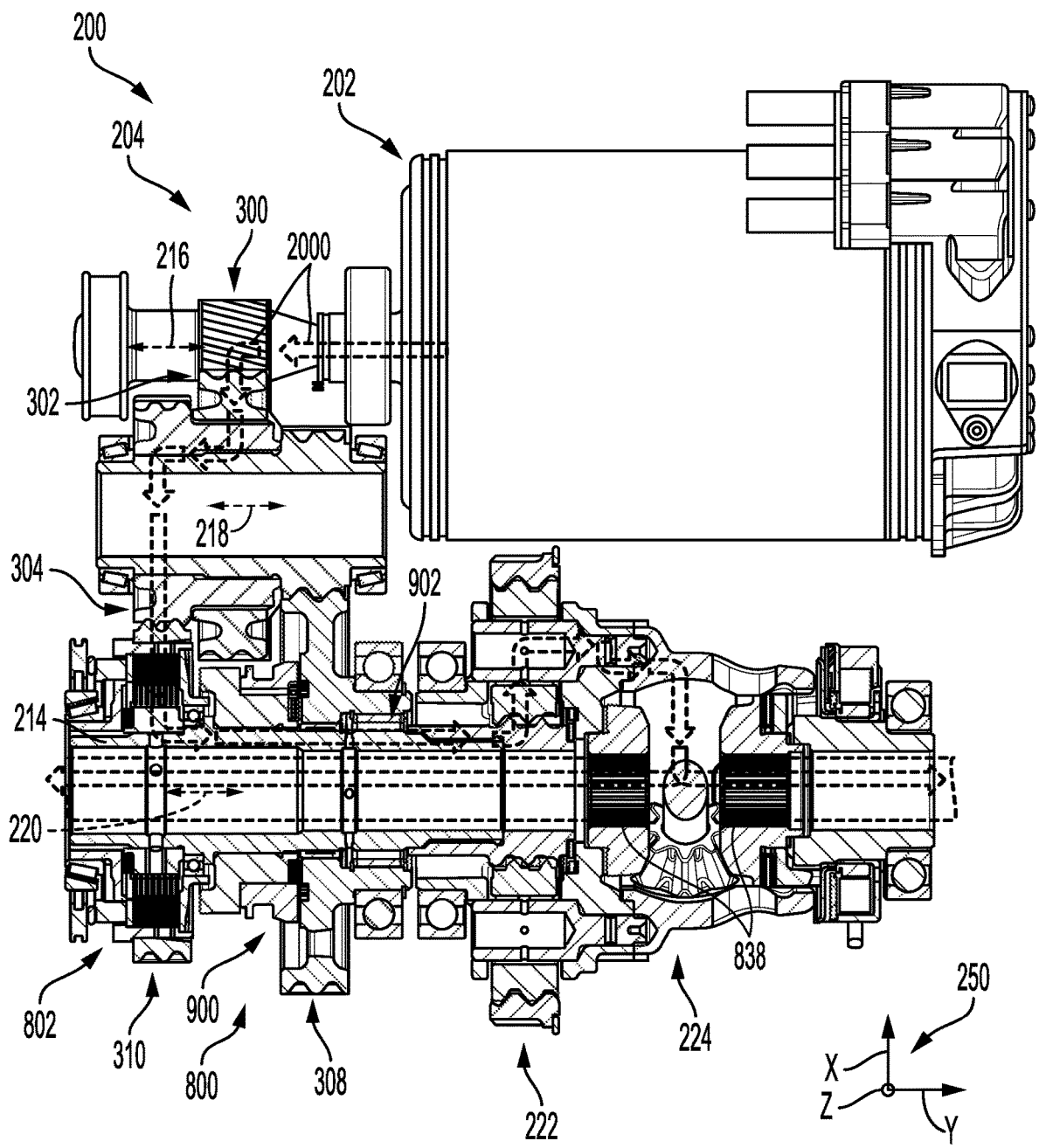
Figure 21:
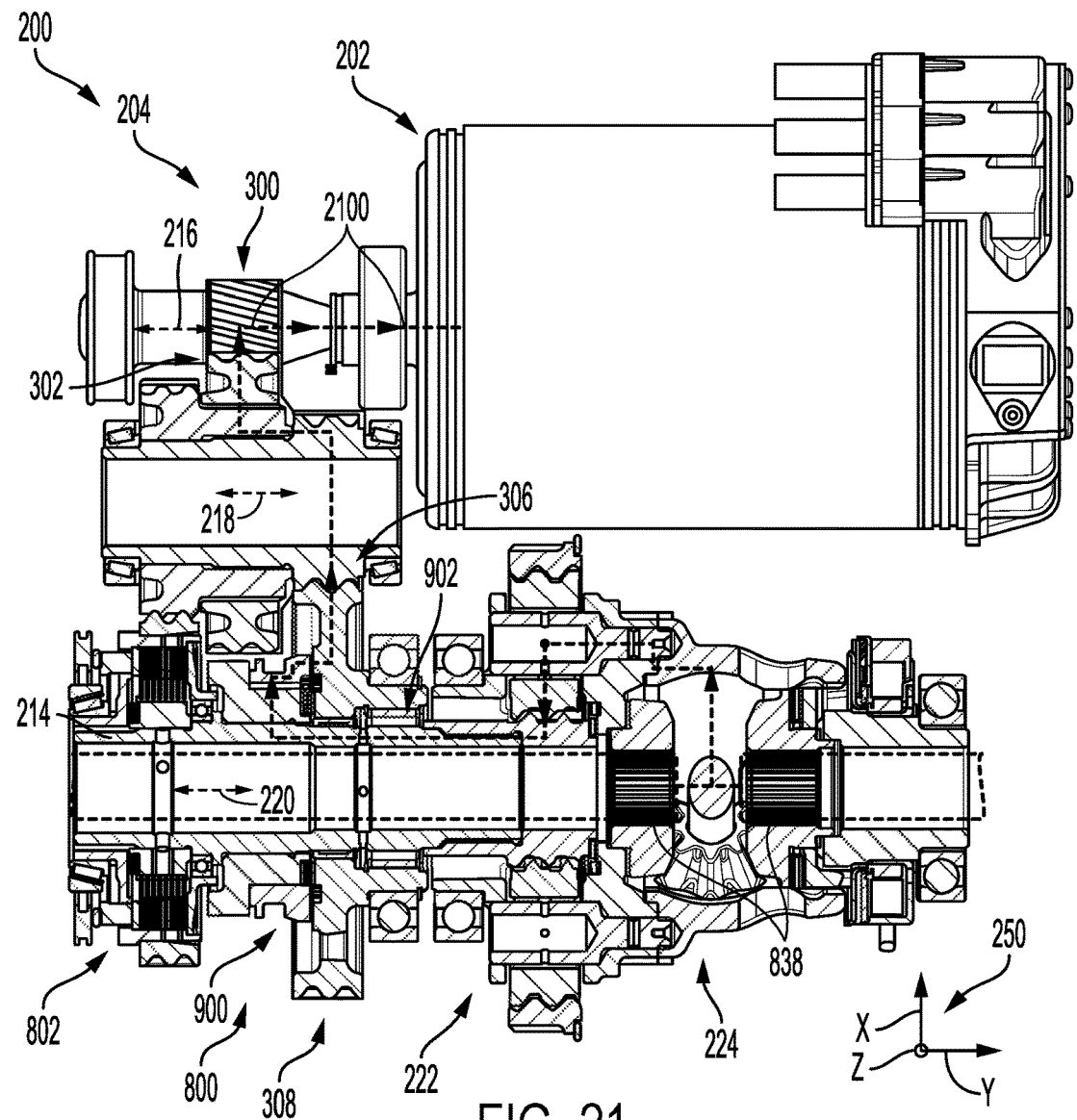
Figure 22:
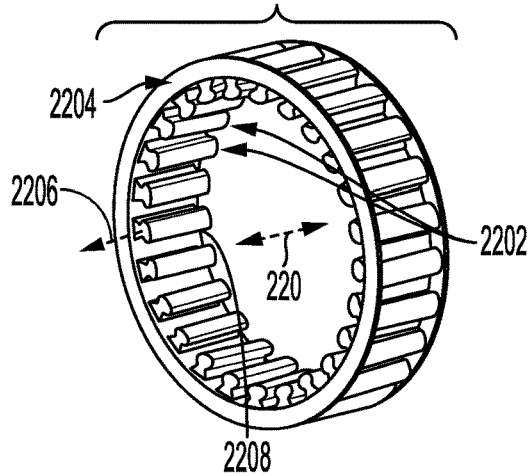
FIG. 22 shows an example of a one-way clutch.

FIG. 1 schematically illustrates a vehicle with an electric drive axle system designed with multiple gear ratios. FIGS. 2-4 illustrate different views of an example of an electric drive axle system. FIG. 5 shows a cross-sectional view of an electric motor-generator included in the electric drive axle system, shown in FIG. 4. FIG. 6 shows a cross-sectional view of an input shaft and intermediate shaft included in a gear train in the electric drive axle system, shown in FIG. 4. FIG. 7 shows a cross-sectional view of an intermediate shaft and an output shaft in the gear train in the electric drive axle system, shown in FIG. 4. FIG. 8 shows a cross-sectional view of the output shaft included in the gear train in the electric drive axle system, shown in FIG. 4. FIG. 9 shows a detailed view of clutch assemblies in the electric drive axle system, shown in FIG. 4. FIGS. 10-12 show detailed views of different sections of the planetary gear assembly allowing the planetary assembly to gain axial compliance. FIGS. 13-16 show views of the planetary gear assembly and the differential with accessible attachment interfaces allow for efficient removal and replacement of the planetary assembly. FIG. 17 shows a housing of the electric drive axle system. FIG. 18 shows a method for swapping planetary gear sets in an electric drive axle. FIGS. 19-21 show exemplary gear train power paths occurring during different modes of system operation. FIG. 22 shows an exemplary embodiment of a one-way clutch. Exemplary as expressed herein does not give any sort of preferential indication but rather denotes potential aspects of the system.

FIG. 1 shows a schematic depiction of a vehicle 100 having an electric drive axle system 102 with a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the gear train 104 are illustrated, by way of example, in greater detail herein with regard to FIGS. 2-22.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality. The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation therefore. Other bearing arrangements with regard to the motor-generator have been contemplated such as arrangements with alternate quantities and/or types of bearings.

The vehicle may take a variety of forms in different embodiments. For example, the vehicle 100 may be hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows rotational energy transfer to be transferred between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. However, other clutch designs have been contemplated, such as a friction clutch (e.g., wet friction clutch), a hydraulic clutch, an electromagnetic clutch, and the like. The structure and function of the one-way and locking clutches are described in greater detail herein. The second clutch assembly 134 may be a wet friction clutch providing smooth engagement/disengagement, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one-use case example, the annulus 187 may be held substantially stationary and the carrier 188, planet gears 189, and the sun gear 190 and the gears' stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between shafts 144 coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled various locations in the vehicle 100 and the electric drive axle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the electric drive axle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136). The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., console instrument panel, touch interface, touch panel, keyboard, combinations thereof, etc.) The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. Other modality transitions have also been contemplated such as a modal transition into a forward drive mode from a reverse drive mode or vice versa responsive to driver input received from the input device 172. However, in other examples more automated gear train mode transitions may be implemented. For instance, the controller may automatically place the gear train in the first gear mode or the second gear mode based on vehicle speed and/or load, for example. The controller 152 may also be configured to transition the electric drive axle system 102 into a regenerative mode. In the regenerative mode, energy is extracted from the gear train using the electric motor-generator 106 and transferred to the energy storage device 108. For instance, the electric motor-generator 106 may be placed in a generator mode where at least a portion of the rotational energy transferred from the drive wheels to the generator by way of the gear train is converted into electrical energy. A variety of different modal control strategies have been contemplated. The power paths unfolding during the different system modes are discussed in greater detail herein with regard to FIGS. 19-21.

FIG. 2 shows an electric drive axle system 200. It will be appreciated that the electric drive axle system 200, shown in FIG. 2, serves as an example of the electric drive axle system 102 shown in FIG. 1. As such, at least a portion of the functional and structural features of the electric drive axle system 102 shown in FIG. 1 may be embodied in the electric drive axle system 200 shown in FIG. 2 or vice versa, in certain embodiments.

The electric drive axle system 200 again includes an electric motor-generator 202 and a gear train 204. The electric motor-generator 202 has an electrical interface 206 which is illustrated as a bus bar in FIG. 2. However, other suitable electrical interfaces may be used, in other examples. The electric motor-generator 202 further includes a housing 208. The gear train 204 may include an input shaft 210, an intermediate shaft 212, and an output shaft 214. The input shaft 210 receives rotational input (forward or reverse drive rotation) from the electric motor-generator 202, while the system is operating in forward and reverse drive modes. Different gears in a gear train 204 are coupled to the different shafts, expanded upon in greater detail herein with regard to FIG. 3. Rotational axes 216, 218, and 220 of the input shaft 210, the intermediate shaft 212, and the output shaft 214 are provided for reference in FIG. 2 and FIGS. 3-22 when applicable. FIG. 2 additionally shows a planetary gear assembly 222 rotationally coupled a differential 224 in the gear train 204. The power paths through the gear train 204 are discussed in greater detail herein. It will be appreciated that placing the planetary gear assembly 222 next to the differential 224 allows less torque to be carried through the gear train 204, enabling the drive train to have fewer and/or smaller components, if wanted.

The planetary gear assembly 222 can achieve a targeted gear ratio (e.g., a relatively high gear ratio, such as a ratio greater than 20:1, in one use-case) in a compact arrangement relative to non-planetary gear arrangements. Thus, the planetary gear assembly can achieve a desired gear ratio with less components (e.g., gears and shafts) than non-planetary gear assemblies, if desired. Furthermore, in embodiments where the planetary gear assembly exhibits a relatively high torque output, the planetary assembly can attain a more compact packaging due to the load sharing between the planet gears, if desired. Axis system 250 is illustrated in FIG. 2 as well as FIGS. 3-22, when appropriate, for reference. The z-axis may be a vertical axis, the x-axis may be a lateral axis, and/or the y-axis may be a longitudinal axis, in one example. However, the axes may have other orientations, in other examples.

FIG. 3 shows the electric drive axle system 200 with the electric motor-generator 202, input shaft 210, intermediate shaft 212, output shaft 214, and gear train 204. The gear train 204 may include a first gear 300 coupled to the input shaft 210. As described herein, the descriptor "coupled to" may indicate one component is structurally coupled to or formed with another component. For instance, the first gear 300 may be machined from a flange on the input shaft 210, in one example, or separately manufactured and subsequently mechanically attached (e.g., welded, bolted, press-fit, etc.) to the input shaft 210.

A second gear 302 is coupled to the intermediate shaft 212. A third gear 304 and a fourth gear 306 are also coupled to the intermediate shaft 212. Additionally, a fifth gear 308 and a sixth gear 310 are coupled to the output shaft 214. It will be understood, that during different modes of system operation different sets of gears may be operational. To elaborate, the first gear 300, the second gear 302, the fourth gear 306, and the fifth gear 308 may be included in a first gear set 312. On the other hand, the first gear 300, the second gear 302, the third gear 304, and the sixth gear 310 may be included in a second gear set 314. A park gear 311 may also be included in the gear train 204, in some examples. However, the gear sets may include different gear combinations, in other examples. It will be understood that the first and the second gear sets 312 and 314 have different gear ratios (e.g., the first gear set may have a higher gear ratio than the second). In this way, the gear train may include multiple gear ratios to increase gear train adaptability. Additionally, the gear sets may share a few common gears (i.e., the first and second gears in the illustrated embodiment). Fixing the first ratio (i.e., the first and second gears) in the gear train can allow the accuracy of the gears to be increased, if wanted, thereby reducing noise, vibration, and harshness (NVH) in the axle system. However, embodiments where the gear sets do not include overlapping gears have been envisioned. Clutches, described in greater detail herein, are included in the gear train 204 to enable the first gear set 312 and the second gear set 314 to be coupled/decoupled to/from the output shaft 214. In this way, the different gear sets may be operationally selected to, for example, more aptly suite the driving environment and/or increase electric motor efficiency. Thus, the first and second gear sets 312 and 314 may be conceptually included in a selectable gear assembly 316. A cutting plane A-A' indicating the cross-sectional view of FIG. 8 is provided in FIG. 3.

The planetary gear assembly 222 is shown in FIG. 3 rotationally coupled to the output shaft 214. FIG. 3 additionally illustrates the differential 224 in the gear train 204 rotationally coupled to the planetary gear assembly 222. However, other gear layouts may be used in other examples, such as non-planetary gear assemblies, gear trains with gears positioned between the planetary assembly and the differential, etc. It will be appreciated that in some embodiments, the gear ratio corresponding to the planetary gear assembly 222 may be greater than the gear ratio corresponding to the first gear set 312 or the second gear set 314. The planetary gear assembly 222 allows a desired gear ratio to be realized in a compact arrangement. For instance, the planetary gear assembly 222 may achieve a relatively high gear ratio and space efficiency, if desired. However, non-planetary gear arrangements may be used, in other examples. Furthermore, the planetary gear assembly 222 and the differential 224 are shown positioned on a lateral side 322 of a housing 208 the electric motor-generator 202. A lateral axis 324 of the motor-generator is provided for reference. Offsetting the output shaft 214 and the intermediate shaft 212 from the input shaft 210 allows the planetary gear assembly 222 to be positioned on the side 322 of the motor-generator. It will be appreciated that the planetary gear assembly may be located adjacent to the motor's lateral side 322 due to the planetary gear assembly's ability to be integrated into the gear train without a mating gear parallel thereto, if wanted. In this way, the planetary gear assembly may be placed in a space which has remained unused in certain electrified gearboxes. Thus, positioning the planetary gear assembly on the side of the motor allows the compactness of the axle system to be increased. As a result, the packaging constraints arising during axle installation in the vehicle may pose less of an issue. However, in other examples, the planetary gear assembly 222 may be positioned in other suitable locations. For instance, the planetary gear assembly may be coupled to a section of the output shaft extending away from the motor-generator.

FIG. 4 shows a side view of the electric drive axle system 200 with the input shaft 210, intermediate shaft 212, and the output shaft 214. A cutting plane B-B' indicating the cross-sectional view of FIG. 5, a cutting plane C-C' indicating the cross-sectional view of FIG. 6, and a cutting plane D-D' indicating the cross-sectional view of FIG. 7, are illustrated in FIG. 4.

FIG. 5 shows a cross-section view of the electric motor-generator 202 and input shaft 210 in the electric drive axle system 200. The input shaft 210 is shown transition fit with a rotor shaft 500. However, other suitable coupling techniques have been contemplated, such as press fitting, welding, splined engagement, etc. The rotor shaft 500 is coupled to a rotor 501 designed to electromagnetically interact with a stator 503 to generate forward drive rotational output, reverse drive rotational output, and/or generate electrical energy during a regeneration mode.

A first bearing 502 and a second bearing 504 are shown coupled to the input shaft 210 with the first gear 300 thereon. The bearing 504 may be positioned on an outboard axial side of the first gear 300 to, for example, reduce shaft bending moments. However, other bearing arrangements have been envisioned, such as a bearing arrangement with two bearings on an inboard side of the first gear 300. As described herein, a bearing is a component designed to enable rotation of the component(s) to which it is attached and therefore may include rolling elements (balls, cylindrical rollers, tapered cylindrical rollers, etc.), races (e.g., inner and outer races), etc., to enable the rotational functionality to be achieved. In one specific example, the first bearing 502 may be a floating bearing and/or may be coupled to the input shaft 210 via a slip fit spline 506. In another specific example, the second bearing 504 may be a fixed bearing. However, other suitable bearing configurations may be used, in other examples, such as an arrangement where both of the bearings are fixed bearings, for instance.

Turning to FIG. 6, where the input shaft 210 and the first gear 300 are shown rotationally attached to the second gear 302 in the intermediate shaft 212 of the gear train 204 of the electric drive axle system 200. Therefore, during gear train operation, rotational motion is imparted between the first gear 300 and the second gear 302. The third gear 304 and the fourth gear 306 attached to the intermediate shaft 212 are also depicted in FIG. 6. However, other gearings arrangements may be used, in other examples. Bearings 600 are shown positioned on opposing axial sides 602 of the intermediate shaft 212. The bearings 600 are specifically illustrated as tapered roller bearings. However, other types of bearings and/or bearing arrangements may be used for the intermediate shaft, in other examples.

FIG. 7 shows a detailed cross-sectional view of the intermediate shaft 212 and the output shaft 214 included in the electric drive axle system 200. The sixth gear 310 is shown coupled to the output shaft 214. The fifth gear 308 is arranged on a bearing 700 coupled to the output shaft 214. The planetary gear assembly 222 and the differential 224 are also shown in FIG. 7. The differential 224 is depicted as a bevel gear differential, in FIG. 7. However, a planetary gear, spur, or helical gear differentials may be used, in other embodiments.

Referring to FIG. 8 showing a more detailed view of the output shaft 214 and corresponding components in the gear train 204 of the electric drive axle system 200. Specifically, the fifth gear 308, the sixth gear 310, the planetary gear assembly 222, and the differential 224 are again depicted. The electric drive axle system 200 includes clutches allowing the gear ratio in the gear train 204 delivered to the planetary gear assembly 222 to be adjusted, based on system operating conditions. Specifically, a first clutch assembly 800 is configured to rotationally couple and decouple the fifth gear 308 to/from the output shaft 214 and a second clutch assembly 802 is configured to rotationally couple and decouple the sixth gear 310 to/from the output shaft.

FIG. 9 shows a detailed view of the first clutch assembly 800 configured to rotationally couple/decouple the fifth gear 308 to/from the output shaft 214 in the gear train 204. To elaborate, the first clutch assembly 800 includes a locking clutch 900 and a one-way clutch 902, in the illustrated example. The one-way clutch 902 is designed to freely rotate about the output shaft 214 when receiving rotational input in a first direction (reverse drive rotational direction) from the fifth gear 308. The one-way clutch 902 may also freely rotate when it is overrun via the output shaft 214. The one-way clutch 902 is also configured to transfer torque to the output shaft 214 when receiving rotational input in a second direction (e.g., front drive rotational direction) from the fifth gear 308. The one-way clutch 902 may be a sprag clutch, in one example. However, other suitable types of one-way clutches may be used in other examples, such as ratcheting clutches. Additionally, a section 903 of the output shaft 214 below the one-way clutch 902 may be locally thicker due to the contact stress and deflection of shaft along the one-way clutch. Snap rings 905 may also be used to axially retain the one-way clutch 902 and/or the bearing 700.

An embodiment of a one-way clutch is shown in FIG. 22. The sprag clutch 2200 includes a plurality of sprag mechanisms 2202 mounted on carrier rings 2204. The sprag mechanisms 2202 may be spring loaded and rotate about axis 2206. The sprag mechanisms 2202 include curved surfaces 2208 having asymmetric profiles. When the fifth gear (e.g., fifth gear 308, shown in FIG. 9) attached to the sprag clutch rotates in the forward drive direction, at a speed greater than the output shaft (e.g., output shaft 214 shown in FIG. 9), the curved surfaces 2108 frictionally engage an outer surface of the output shaft and an inner surface of the fifth gear to allow the fifth gear and the output shaft to rotate in unison. Contrariwise, when the fifth gear is rotated in the reverse drive direction or the output shaft speed exceeds the gear speed, the curved surfaces 2108 in the sprag mechanisms 2102 disengage and allow the fifth gear 308, shown in FIG. 9, to freewheel with regard to the output shaft 214, referred to herein as a freewheel configuration. The sprag clutch allows for quick and robust engagement between the clutch and the shaft when transitioning from the freewheel configuration to the engaged configuration. The sprag clutch may also have less drag in the freewheel configuration when compared to other types of one-way clutches, such as one-way clutches including ratcheting mechanisms.

The locking clutch 900, illustrated in FIG. 9, is designed to rotationally couple and decouple the fifth gear 308 from the output shaft 214. To elaborate, the locking clutch 900 may be a dog clutch with teeth 904 on an axially adjustable shift collar 906 designed to mate with teeth 908 in the fifth gear 308 when engaged. Conversely, when the dog clutch is disengaged the teeth 904 on the shift collar 906 may be spaced away from the teeth 908 on the fifth gear 308. The bearing 700 (e.g., needle roller bearing) coupled to the fifth gear 308 is also shown in FIG. 9. It will be appreciated that the bearing 700 may pilot the one-way clutch 902. The shift collar 906 may be rotationally attached to the output shaft 214 by way of an indexing shaft 910. Furthermore, the indexing shaft 910 may be attached to the output shaft via press-fitting, a splined interface, combinations thereof, etc. However, the first clutch assembly 800 may take other forms, in alternate embodiments. For instance, the first clutch assembly may be a friction clutch, in an alternate example.

A thrust bearing 912 (e.g., needle roller thrust bearing) is also shown positioned at an interface between the indexing shaft 910 and the fifth gear 308 to enable a desired spacing to be maintained between the components while allowing rotation therebetween. Additionally, the thrust bearing 912 may be preloaded via a spring 914 (e.g., a wave spring, helical spring, elastomeric spring, etc.). However, other suitable gear train arrangements may be used in other examples such as gear trains where the spring 914 and/or thrust bearing 912 are omitted. A bearing 916 (e.g., a fixed bearing) is also shown attached to an extension 918 (e.g., axial extension) of the fifth gear 308 interfacing with the one-way clutch 902. However, in other examples the bearing 916 may be omitted from the gear train. The bearing 916 is specifically depicted as a ball bearing. The ball bearing may be used in the system, due to cost and packaging. However, the bearing 916 may be a spherical roller bearing, a tapered roller bearing, four point contact bearing, etc., in other embodiments. In one example, the bearing 916 may be fixed on both sides to allow the spring 914 to apply a preload to the thrust bearing 912 and the sixth gear 310 during planetary gear ratio swap, to simply the gear swapping procedure, discussed in greater detail herein. The one-way clutch 902 is also shown positioned between the extension 918 of the fifth gear 308 and an outer surface 919 of the output shaft 214. However, alternate locations of the one-way clutch have been contemplated.

The second clutch assembly 802 is depicted in FIG. 9 as a wet friction clutch. Using a wet friction clutch enables load transfer in both forward and reverse directions, allowing the drive train's second clutch assembly to forego a locking clutch in the second clutch assembly, in some instances. However, alternate types of clutches such as hydraulic clutches, electromagnetic clutches, and the like may be deployed, in other arrangements. The wet friction clutch includes friction plates 920 engaging one another during clutch activation to transfer rotational energy from the sixth gear 310 to the output shaft 214. Likewise, when the wet friction clutch is disengaged, the friction plates 920 are frictionally decoupled and rotational energy transfer from the sixth gear 310 to the output shaft 214 is inhibited. To elaborate, a first set of friction plates 921 are coupled to the sixth gear 310 and a second set of friction plates 923 are coupled to the output shaft 214 to enable coupling/decoupling action in the clutch.

Various bearings may enable the wet friction clutch to be rotated as well as provide axial and radial support to the clutch. The bearing corresponding to the wet friction clutch may include for example, a floating bearing 922, a roller bearing 924 (e.g., needle roller bearing, a thrust bearing 926 (e.g., needle roller thrust bearing), and a roller bearing 928. However, other suitable bearing arrangements providing a desired amount of radial and axial support to the wet friction clutch and output shaft have been contemplated. It will also be appreciated that lubricant may be routed to the wet friction clutch, to increase clutch longevity, in some embodiments.

The wet friction clutch 802 and the locking clutch 900 may be adjusted via commands from a controller, such as the controller 152 shown in FIG. 1, to induce engagement or disengagement of each clutch. As such, the gear train's gear ratio may be adjusted as desired based on vehicle operating conditions, driver input, etc.

Referring again to FIG. 8, showing the planetary gear assembly 222 rotationally coupled to the output shaft 214. FIG. 8 also illustrates the planetary gear assembly 222 with a sun gear 810 rotationally coupled to output shaft 214. The sun gear 810 is rotationally coupled to planet gears 812 residing on planet pins 814 on a carrier 816. In turn, the carrier 816 is shown coupled to the differential 224. However, planetary arrangements with other components (e.g., carrier or annulus) coupled to the output shaft 214 and other components (e.g., sun gear or annulus) coupled to the differential 224, have been envisioned. The planetary gear assembly 222 also includes an annulus 818 rotationally interacting with the planet gears 812. Bearings 820 (e.g., needle roller bearings) arranged between the planet pins 814 and the planet gears 812 may allow the planet gear to rotate. A thrust bearing 822 (e.g., needle roller thrust bearing) may also be coupled to the sun gear 810 to enable rotation thereof and provide axial support thereto.

The annulus 818 may be held fixed to enable the planetary gear assembly 222 to achieve a relatively high gear ratio. Thus, the annulus 818 may include suitable features such as a spline 828 to enable the position of the annulus to be fixed. However, planetary gear arrangements where alternate components are held fixed and alternate components are allowed to rotate may be utilized, in other examples. For instance, the annulus may be allowed to freely rotate and the carrier may be held stationary, in one example, or the sun gear may be held stationary and the carrier and the annulus may be allowed to rotate, in other examples. In one embodiment, the components in the planetary gear assembly that are allowed to rotate and held stationary may not be adjustable. To elaborate, the components in the planetary gear assembly that are allowed to rotate and held substantially stationary may remain in the same state (a substantially fixed state or a rotational state) during gear train operation, in some embodiments. The planetary gear assembly can therefore achieve even greater space efficiency, in such an embodiment, by forgoing planetary actuators, for instance. In other embodiments, planetary components whose fixed/rotational state can be adjusted during gear train operation have also been contemplated. Thrust washers and/or bushings 830 may also be positioned on opposing axial sides of the planet gears 812 to provide planet gear spacing and support functionality.

A clutch assembly 832 configured to lock and unlock the differential 224 may also be included in the gear train 204. The clutch assembly 832 may, in one example, include a dog clutch 834 configured to operate in a locked and unlocked configuration. In the locked configuration the dog clutch 834 causes the side gears 836 to rotate in unison. Conversely, in the unlocked configuration, the dog clutch 834 allows the side gears 836 to have rotational speed variance. One of the gears 836 may therefore include teeth 837 mating/disengaging with/from teeth 839 in the dog clutch 834. The clutch assembly 832 may further include an electronic actuator 835 (e.g., solenoid) inducing engagement and disengagement of the clutch assembly 832. However, pneumatic or hydraulic clutch actuation may be utilized, in other embodiments.

FIG. 8 also shows the differential 224 rotationally coupled to an axle 838. Specifically, the side gears 836 may be rotationally attached to axle 838. The axle 838 is shown including a first shaft section 840 which may be coupled to a first drive wheel and a second shaft section 842 which may be coupled to a second drive wheel. However, in other examples, a continuous shaft may extend through the differential or the shaft may be partitioned into additional sections. The axle 838 may be a beam axle, enabling the load carrying capacity and the durability of the axle to be increased, if wanted. However, non-rigid axle designs may be utilized, in other cases. Additionally, the axle 838 is positioned within an interior opening 841 of the output shaft 214 and is positioned co-axial therewith, to increase system compactness. However, off-axis axle-output shaft layouts may be used, in some instances. A bearing 846 is also shown coupled to a case 848 of the differential 224. Additionally, a bearing 849 is shown coupled to the planetary gear assembly 222 (e.g., the carrier 816). However, the bearing 849 may be omitted or placed in another suitable location, in other embodiments.

The case 848 is rotationally coupled to the carrier 816. In turn, the case 848 is rotationally coupled to internal differential gearings. FIG. 8 specifically shows the differential 224 embodied as a locking type differential (e.g., electronic locking differential). However, as previously discussed, alternate types of differentials have been contemplated such limited slip differentials (e.g., electronic limited slip differentials), differentials with a torque vectoring dual clutch, open differentials, etc. In the case of an open differential, the differential may share a common case with the planetary gear assembly and the case may be sized and profiled to enable differential gear installation. Furthermore, the differential 224 depicted in FIG. 8 includes bevel gears 860 attached via a bevel gear shaft 862. Additionally, in the illustrated embodiment, the bevel gears 860 are rotationally coupled to the side gears 836. However, planetary, spur, and helical gear type differentials may be used, in other examples.

FIG. 8 also shows an actuator 850 of the second clutch assembly 802. The actuator 850, in the illustrated example, includes a piston 852 configured to cause engagement/disengagement of the second clutch assembly 802. However, the actuator may include other suitable components designed to alter the configuration of the clutch assembly, in other examples. Continuing with the piston actuator example, the piston 852 is configured to move in axial directions 854 to accomplish the aforementioned engagement/disengagement action. It will be appreciated that the axial directions 854 may be parallel to the rotational axis 220 of the output shaft 214.

During the second gear mode, when the actuator 850 urges the second clutch assembly 802 into the engaged configuration a force, indicated via arrow 856 and generate by the actuator 850, is transferred to the output shaft 214. To increase the longevity of bearings coupled to the output shaft 214, such as bearing 928, bearing 916, etc., the planetary gear assembly 222 may be designed to transfer an axial force, indicate via arrow 858, to the output shaft 214 that at least partially counteracts (e.g., substantially counteracts) the piston force 856. However, packaging and manufacturing pose challenges when designing a planetary gear assembly that generates a desired force that at least partially counteracts the piston forces. For instance, the sun gear 810 may, in one use-case example, be attached to the output shaft 214 subsequent to installing the park gear 311 and the fifth gear 308 on the shaft. Consequently, the sun gear may not be able to fully spline onto the output shaft 214 with the spline being below the teeth of the sun gear, due to the ratio and profile of the annulus 818 as well as the inner diameter of the output shaft being substantially fixed, in some cases.

To allow the planetary gear assembly 222, and specifically the sun gear 810, to generate the axial force to counteract the actuator force 856, the assembly may include a snap ring 1000, a spring 1002 (e.g., wave spring, helical spring, elastomeric spring, etc.), and/or a thrust bearing 1004 (e.g., needle roller thrust bearing), shown in FIG. 10. FIG. 10 specifically depicts the snap ring 1000, the spring 1002, and the thrust bearing 1004 subsequent to attachment between the planetary gear assembly 222 and the differential 224.

The planet pins 814 are also shown in FIG. 10, axially extending through openings 1008 in the carrier 816. Specifically, distal ends 1006 of the planet pins 814 are shown extending through the carrier 816 and into recesses 1010 in the case 848 of the differential. Positioning the planet pins 814 in this manner allows the pins to serve as alignment datums for positioning the differential 224 with regard to the planetary gear assembly 222. However, in other examples, the planet pins and carrier may have an alternate configuration. For instance, the planet pins may be coupled to an exterior surface of the carrier.

FIG. 11 shows a more detailed view of the snap ring 1000, the spring 1002, and the thrust bearing 1004 in the planetary gear assembly 222. The spring 1002 is shown positioned in a recess 1100 in the carrier 816. The snap ring 1000 is also shown residing in an indent 1102 in the carrier 816. Additionally, a washer 1104 is shown with an "L" shape adjacent to the thrust bearing 1004. However, differently shaped washers have been contemplated.

Figure 13:
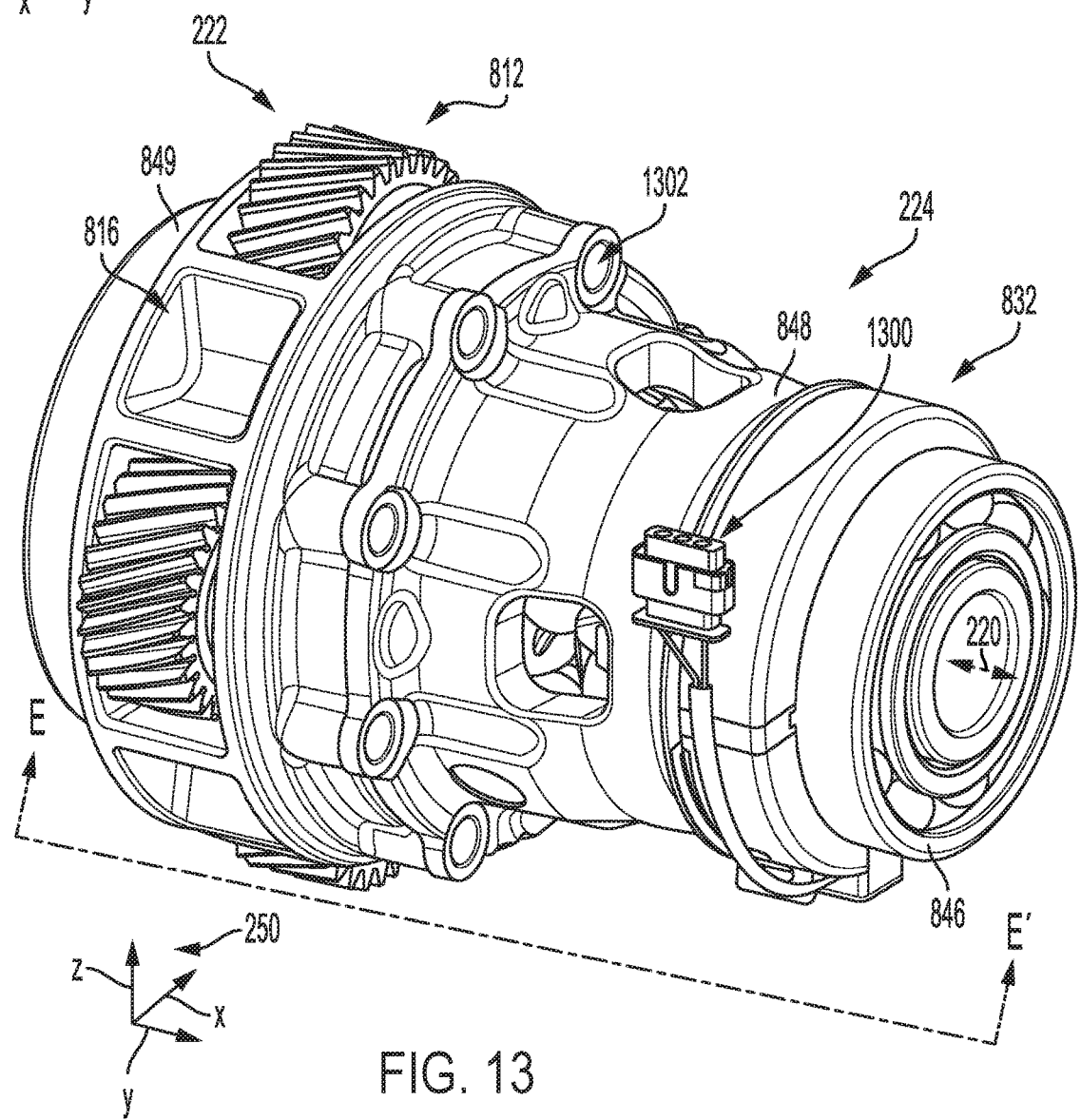
FIG. 13 shows a perspective view of the planetary gear assembly and the differential in the gear train of the electric drive axle system, depicted in FIG. 2.

The assembly process of the planetary gear assembly 222, prior to assembly between the planetary gear assembly and the differential, may unfold as follows: (i) the snap ring 1000, spring 1002, and thrust bearing 1004 are assembled with the carrier 816 and the spring 1002 presses the thrust bearing into the snap ring such that the thrust bearing does not contact the carrier 816, and (ii) the sun gear 810, shown in FIG. 13, is inserted and mated with the planet gears 812 and compresses the spring 1002 such that the thrust bearing 1004 contacts the surface 1105 of the carrier 816. After the sun gear is installed, an axial gap 1106 exists between the thrust bearing 1004 and the washer 1104. The gap 1106 enables the system to gain compliance when the sun gear 810, shown in FIG. 12, is attached to the output shaft 214, shown in FIG. 12. In this way, the installation tolerances corresponding to the output shaft assembly may be expanded to reduce the likelihood of installation errors.

Turning specifically to FIG. 12 showing the interface 1200 between the sun gear 810 and the output shaft 214. Specifically, a radially aligned surface 1202 of the sun gear 810 is shown in face sharing contact with a radially aligned surface 1204 of the output shaft 214. In this way, axial force may be transferred between the output shaft 214 and the sun gear 810. However, other profiles of the interface between the sun gear and output shaft may be used, in other examples.

FIG. 13 shows a perspective view of the planetary gear assembly 222 again including the carrier 816 and the planet gears 812. The bearing 849 coupled to the carrier 816, the bearing 846 coupled to the case 848 of the differential 224, as well as the clutch assembly 832, are also depicted in FIG. 13. An electrical interface 1300 of the clutch assembly 832 is additionally illustrated. However, clutches using hydraulic or pneumatic actuation have also been contemplated. The differential 824 also includes attachment openings 1302 in the case 848. The attachment openings 1302 allow for quick attachment of the case 848 to the carrier 816. A cutting plane E-E' indicating the cross-sectional view of FIG. 14 is also provided in FIG. 13.

Figure 14:
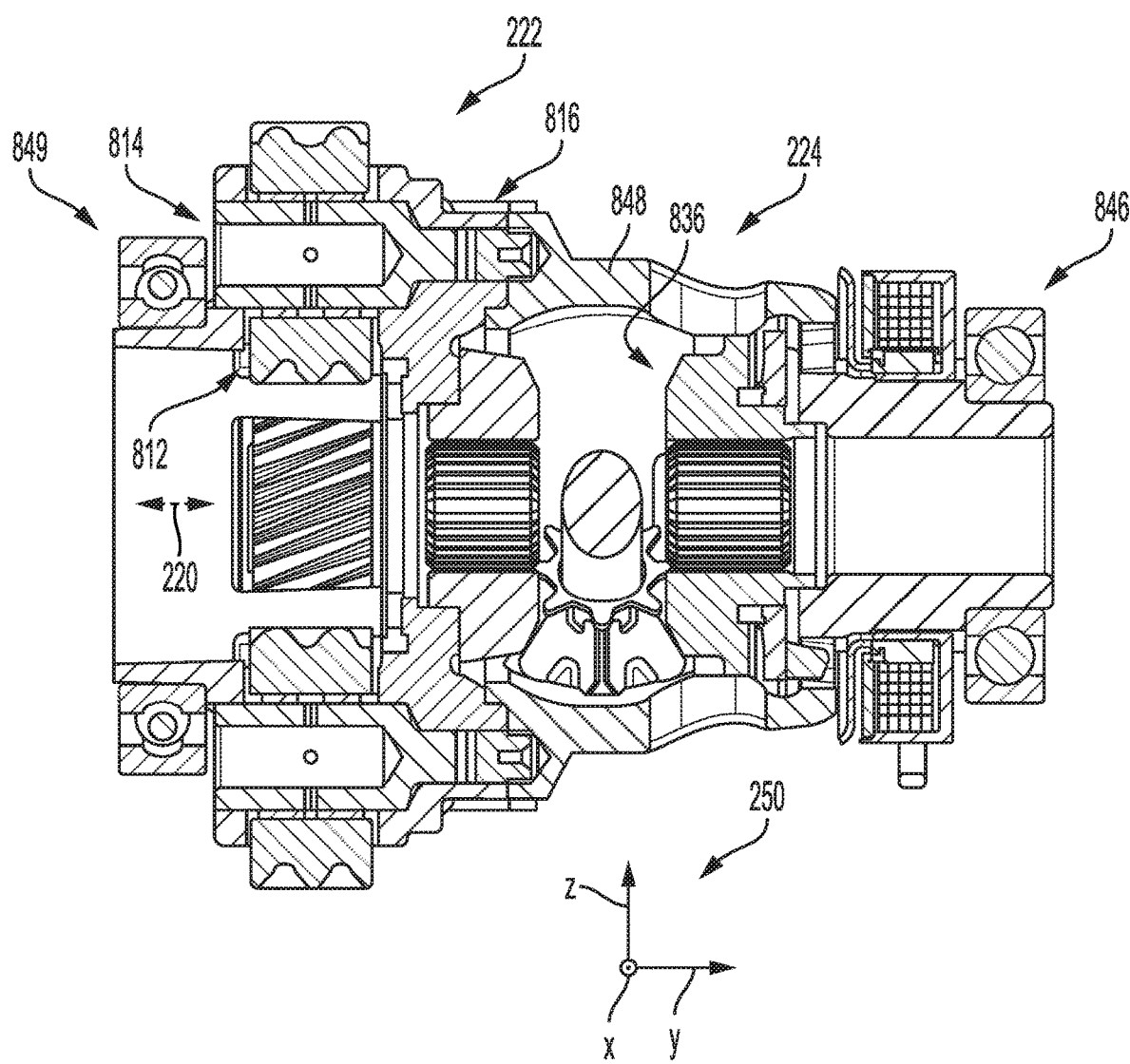
FIG. 14 shows a cross-sectional view of the planetary gear assembly and the differential, shown in FIG. 13.

FIG. 14 shows a cross-sectional view of the planetary gear assembly 222 and the differential 224. The planet gears 812, planet pins 814, and carrier 816 of the planetary gear assembly are again illustrated. The case 848 and side gears 836 of the differential 224, are also shown in FIG. 14. The bearing 849 coupled to the planetary gear assembly 222 and the bearing 846 coupled to the differential 224, are also depicted.

Figure 15:
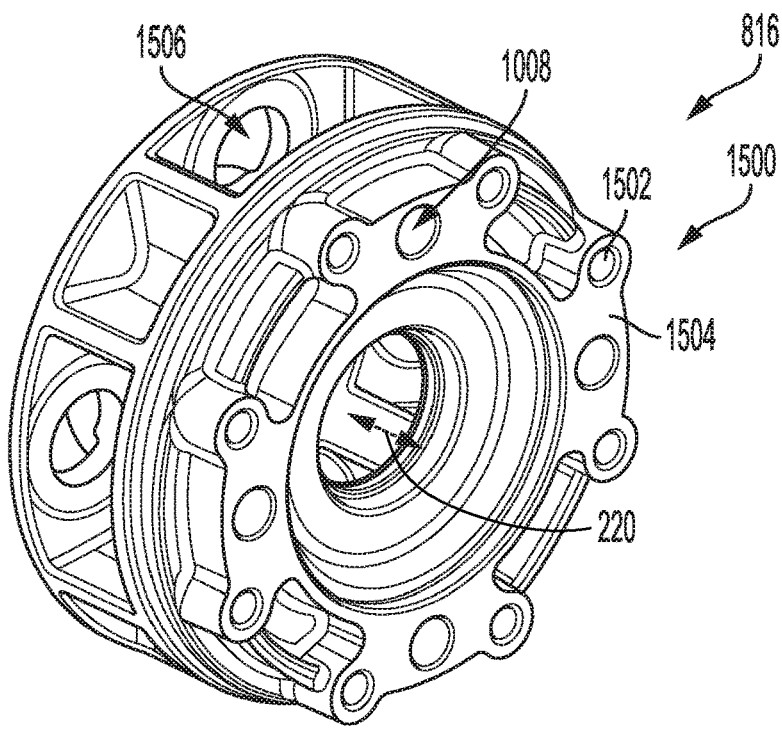
FIG. 15 shows a perspective view of a carrier in the planetary gear assembly, shown in FIG. 13.

FIG. 15 shows a perspective view of the carrier 816 in the planetary gear assembly. The carrier 816 is shown including an attachment interface 1500 with openings 1502 and a radially aligned surface 1504. Planet pin openings 1008 accommodating for pin insertion are also depicted in FIG. 15. Openings 1506 in the carrier 816 allowing for other sections of the planet to be inserted therethrough, are also depicted.

Figure 16:
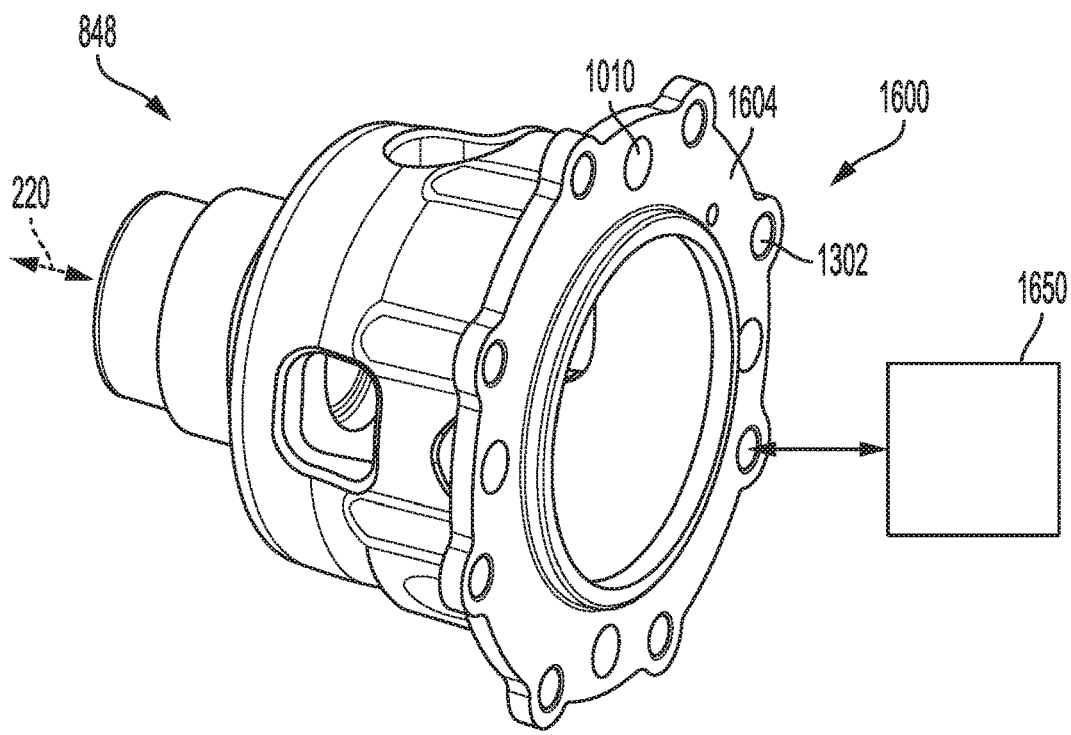
FIG. 16 shows a perspective view of a section of the differential, shown in FIG. 13.

FIG. 16 shows a perspective view of the case 848 of the differential. The case 848 is shown including an attachment interface 1600 with openings 1302 and a radially aligned surface 1604. It will be appreciated that the attachment interface 1600 of the differential is designed to attach to the attachment interface 1500 of the carrier 816, shown in FIG. 15. For instance, the openings in each interface may be aligned with one another and attachment devices (e.g., bolts, pins, screws, etc.) may extend therethrough. It will be understood, that the attachment interface 1600 in the differential is also designed to attach to another carrier interface in a second planetary gear assembly, schematically depicted at 1650. Thus, each attachment interface in the planetary assemblies and the differential may have a similar attachment opening pattern. In such an example, the second planetary gear assembly has a different gear ratio than the planetary gear assembly 222, shown in FIG. 8. In this way, the differential is configured to efficiently attach to multiple planetary gear assemblies having different gear ratios. Thus, end-users such as vehicle owners, mechanics, etc., can easily swap a stage (e.g., late stage) of gearing in the gear train, thereby increasing system adaptability and increasing customer satisfaction. As described herein swapability may denote the ability of an end-user (e.g., vehicle owner, mechanic, etc.) to remove and replace one component with another. The recesses 1010 in the differential case 848 are also shown in FIG. 16. As previously discussed, the recesses mate with ends of the planet pins to achieve desired alignment between the components.

FIG. 17 a housing 1700 which may be included in the electric drive axle system 200. The housing 1700 may enclose the electric motor-generator 202, the gears on the geartrain shafts (input shaft 210, intermediate shaft 212, output shaft 214, planetary gear assembly 222, and the differential 224, shown in FIG. 2. In the illustrated embodiment, the housing 1700 includes a first section 1702 that may at least partially enclose the electric motor-generator and the planetary gear assembly and differential. Further, in the illustrated embodiment, a second housing section 1704 is shown that may at least partially enclose the gear sets on the input, intermediate, and output shafts as well as the clutch assemblies. Additionally, FIG. 17 illustrates a third housing section 1706 that may at least partially enclose sections of the planetary gear assembly and the differential. To elaborate, the third housing section 1706 allows access to the planetary gear assembly to be gained for repair, swapping, etc. Thus, in one use-case example, an end-user can rapidly gain access to the planetary assembly solely by removing the third housing section 1706. However, other housing partitioning schemes have been envisioned, where additional sections may be removed to access the planetary gear set and the differential. A first attachment interface 1708 extends between the first housing section 1702 and the second housing section 1704. A second attachment interface 1710 extends between the second housing section 1704 and the third housing section 1706 to facilitate coupling/decoupling of the sections. Attachment devices 1711 (bolts, pins, clamps, etc.) facilitate the coupling and decoupling of the housing sections are also shown in FIG. 17. The first housing section 1702 also includes an opening 1712 circumferentially surrounding the second axle shaft section 842 shown in FIG. 8, when the system is assembled. The second housing section 1704 correspondingly includes an opening 1714 circumferentially surrounding the first axle shaft section 840 shown in FIG. 8, when the system is assembled. A fourth housing section 1716 may also be coupled to the first housing section 1702 to enable the electric motor-generator to be efficiently inserted into the housing.

FIG. 18 shows a method 1800 for swapping gears in a gear train. It will be appreciated that the method 1800 for gear swapping may take place in the electric drive axle system, gear train, components, etc., described above with regard to FIGS. 1-17, in one example. However, in another example, the gear swapping method may be carried out in another suitable electric drive axle system and gear train.

At 1802 the method includes, while the electric drive axle is attached to a vehicle, removing a section (e.g., single section) of an axle housing. For instance, the section of the drive axle's housing providing access to the differential and the planetary gear assembly may be removed when the drive axle remains coupled to the vehicle's suspension and/or frame. In this way, access to a late gearing stage (e.g., final stage) may be gained.

At 1804 the method includes decoupling a first planetary gear assembly from a differential and an output shaft. For example, attachment devices may be removed from aligned interfaces in each of the first planetary gear assembly and the differential.

Next at 1806 the method includes coupling a second planetary gear assembly to the differential and the output shaft. For instance, the second planetary gear assembly may be mated with the output shaft and the attachment interface in the planetary assembly may be align with the interface in the differential and bolted thereto. In this way, planetary gear sets may be quickly and efficiently swapped.

FIGS. 19-21 show the gear train 204 operating in different modes. As such, the gear train 204 may be placed in different operational modes via a controller, such as the controller 152, shown in FIG. 1. The modes may include a first gear mode where the first gear set 312, shown in FIG. 3, transfers rotational energy between the electric motor-generator 202 and the planetary gear assembly 222. The modes may also include a second gear mode where the second gear set 314, shown in FIG. 3, transfers rotational energy between the electric motor-generator 202 to the planetary gear assembly 222. The modalities may also be partitioned based on reverse and forward drive motor arrangement. To elaborate, the electric motor-generator 202 may produce rotational output in a first direction corresponding to forward drive and may produce rotational output in a second direction opposing the first corresponding to reverse drive. As such, the gear train modalities may include a forward drive first gear mode, a reverse drive first gear mode, a forward drive second gear mode, and/or a reverse drive second gear mode. It will also be understood that the gear train may be operated in a regenerative mode where torque input from the drive wheels, such as the drive wheels 128 shown in FIG. 1, is transferred to the electric motor-generator and the electric motor-generator converts at least a portion of the drive train's rotational energy into electrical energy. In turn, in the regenerative mode the electric energy may be transferred from the motor-generator to an energy storage device, such as the energy storage device 108 shown in FIG. 1.

Turning to FIG. 19, illustrating the gear train 204 of the electric drive axle system 200 arranged in the forward drive first gear mode where the electric motor-generator 202 produces forward drive rotational output, the second clutch assembly 802 is disengaged, and the first clutch assembly 800 is engaged (e.g., configured to transfer energy from the fifth gear 308 to the output shaft 214 via the one-way clutch 902). The power path in the forward drive first gear mode of the gear train 204 is indicate via arrows 1900. Thus, in the forward drive first gear mode, rotational energy is transferred from the electric motor-generator 202 to the first gear 300, from the first gear to the second gear 302, from the fourth gear 306 to the fifth gear 308, from the fifth gear through the first clutch assembly 800 (e.g., through the one-way clutch 902) to the output shaft 214, from the output shaft to the planetary gear assembly 222, from the planetary gear assembly to the differential 224, and from the differential to the axle 838.

FIG. 20 shows the gear train 204 of the electric drive axle system 200 arranged in the forward drive second gear mode where the electric motor-generator 202 produces forward drive rotational output, the second clutch assembly 802 is engaged, and the first clutch assembly 800 is disengaged (e.g., the locking clutch 900 is disengaged and the one-way clutch 902 is overrun). It will be understood, that the one-way clutch 902 is overrun due to the ratio of the mesh between the third gear 304 and sixth gear 310 being lower than the ratio of the mesh between the fourth gear 306 and the fifth gear 308, resulting in no load being transferred between the fourth and fifth gear. The power path in the forward drive second gear mode of the gear train 204 is indicate via arrows 2000. Thus, in the forward drive second gear mode, rotational energy is transferred from the electric motor-generator 202 to the first gear 300, from the first gear to the second gear 302, from the third gear 304 to the sixth gear 310, from the sixth gear through the second clutch assembly 802 to the output shaft 214, from the output shaft to the planetary gear assembly 222, from the planetary gear assembly to the differential 224, and from the differential to the axle 838.

FIG. 21 shows the gear train 204 of the electric drive axle system 200 arranged in the regenerative first gear mode where the electric motor-generator 202 generates electrical energy from drive wheel torque transferred to the motor-generator through the gear train 204. Additionally, in the regenerative first gear mode the second clutch assembly 802 is disengaged, and the first clutch assembly 800 is engaged (e.g., configured to transfer energy from the fifth gear 308 to the output shaft 214 via the locking clutch 900). The power path in the regenerative first gear mode of the gear train 204 is indicate via arrows 2100. As such, in the regenerative first gear mode, rotational energy is transferred from the differential 224 to the planetary gear assembly 222, from the planetary gear assembly to the output shaft 214, from the output shaft to the fifth gear 308 through the first clutch assembly 800 (e.g., through the locking clutch 900 bypassing the one-way clutch 902), from the fifth gear to the fourth gear 306, from the second gear 302 to the first gear 300 and then to the electric motor-generator 202.

It will be appreciated that during a reverse first gear mode, the power path through the gear train 204 may be similar to the power path shown in FIG. 19. For instance, the power path in the reverse first gear mode may travel through the similar components to the power path denoted via arrows 1900. However, in the reverse power path the arrows are reversed. Therefore, in the reverse first gear mode the second clutch assembly 802 may be disengaged, and the first clutch assembly 800 may be engaged (e.g., configured to transfer energy from the fifth gear 308 to the output shaft 214 via the locking clutch 900).

The electric drive axle systems and gear swapping techniques described herein have the technical effect of providing a system in which a first planetary gear assembly coupled to a differential can be quickly and efficiently removed and replaced with a second planetary gear assembly having a different gear ratio than the first planetary assembly. Consequently, drive train adaptability is increased along with end-user satisfaction.

FIGS. 1-22 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric drive axle system is provided that comprises: a gear train configured to rotationally attach to an electric motor-generator, the gear train comprising: an output shaft rotationally coupled to a first planetary gear assembly axially offset from an input shaft rotationally coupled to the electric motor-generator, the first planetary gear assembly configured to removably attach to a differential arranged co-axial with an axle.

In another aspect, a method for swapping gear sets in an electric drive axle system, is provided that comprises: while the electric drive axle system is attached to a vehicle, removing a section of a housing from sections of the housing enclosing an electric motor-generator and a selectable gear set; and decoupling a first planetary gear assembly from a differential and an output shaft rotationally coupled to the selectable gear set; and coupling a second planetary gear assembly to the differential and the output shaft, the second planetary gear assembly having a different gear ratio than the first planetary gear assembly.

In yet another aspect, an electric drive axle system is provided that comprises: a gear train configured to rotationally attach to an electric motor-generator, the gear train comprising: an input shaft rotationally coupled to the electric motor-generator and an output shaft rotationally coupled to a differential, where the input shaft is axially offset from the output shaft; where the differential is configured to attach to a first planetary gear assembly and a second planetary gear assembly having a different gear ratio than the first planetary gear assembly.

In any of the aspects or combinations of the aspects, the planetary gear assembly may include a first attachment interface coupled to a second attachment interface in the differential.

In any of the aspects or combinations of the aspects, the second attachment interface in the differential may be configured to attach to a third attachment interface in a second planetary gear assembly and where the first planetary gear assembly has a different gear ratio than the second planetary gear assembly.

In any of the aspects or combinations of the aspects, the first planetary gear assembly may include a plurality of planet pins configured as datums to align a carrier in the first planetary gear assembly and a case of the differential.

In any of the aspects or combinations of the aspects, the plurality of planet pins may extend axially through the carrier.

In any of the aspects or combinations of the aspects, the differential may be directly coupled to the first planetary gear assembly without any intervening components positioned therebetween.

In any of the aspects or combinations of the aspects, the differential may be a locking differential configured to rotationally lock and unlock sections of the axle.

In any of the aspects or combinations of the aspects, the axle may be a beam axle.

In any of the aspects or combinations of the aspects, the electric drive axle system may further comprise a clutch assembly configured to rotationally couple and decouple a gear set from the output shaft, where a sun gear in the first planetary gear assembly is configured to counteract at least a portion of an axial force acting on the clutch assembly when the clutch assembly is engaged.

In any of the aspects or combinations of the aspects, the electric drive axle system may further comprise a snap ring, spring, and thrust bearing coupled to the sun gear and a carrier in the first planetary gear assembly.

In any of the aspects or combinations of the aspects, when the first planetary gear assembly is decoupled from the differential, the thrust bearing may not contact the carrier, and when the first planetary gear assembly is coupled to the differential, the thrust bearing may contact the carrier.

In any of the aspects or combinations of the aspects, decoupling the first planetary gear assembly from the differential may include removing attachment devices extending through attachment interfaces in each of the first planetary gear assembly and a differential case.

In any of the aspects or combinations of the aspects, coupling the second planetary gear assembly to the differential may include aligning an attachment interface in the second planetary gear assembly with the attachment interface in the differential.

In any of the aspects or combinations of the aspects, the method may further include aligning the attachment interface in the second planetary gear assembly with the attachment interface in the differential.

In any of the aspects or combinations of the aspects, the differential may include an attachment interface configured to couple to an attachment interface in the first planetary gear assembly and an attachment interface in a second planetary gear assembly having a different gear ratio than the first planetary gear assembly.

In any of the aspects or combinations of the aspects, the system may further comprise a clutch assembly configured to rotationally couple and decouple a gear set from the output shaft, where a sun gear in the first planetary gear assembly may be configured to counteract at least a portion of an axial force acting on the first clutch assembly when the first clutch assembly is engaged.

In any of the aspects or combinations of the aspects, the first planetary gear assembly may include a plurality of planet pins extending axially through a carrier and into recesses in a differential case.

In any of the aspects or combinations of the aspects, the axle may be a beam axle, the beam axle may be arranged co-axial with the output shaft, and the differential may be a locking differential.

In another representation, a gearbox rotationally coupled to an electric motor-generator is provided that may include a differential configured to removably and directly coupled to multiple planetary gear sets having substantially similar attachment opening patterns but have distinct gear ratios, the planetary gear assemblies are each configured to receive rotational input from an output shaft co-axial with a beam axle.

In another representation, an electric drive axle system is provided that comprises a gear train configured to rotationally attach to an electric motor-generator. The gear train comprises an output shaft rotationally coupled to a planetary gear assembly axially offset from an input shaft rotationally coupled to the electric motor-generator, the planetary gear assembly attached to a differential arranged co-axial with an axle; where the planetary gear assembly includes a plurality of planet pins configured as datums to align a carrier in the planetary gear assembly with a case of the differential.

In any of the representations or combinations of the representations, the plurality of planet pins may extend axially through the carrier.

In any of the representations or combinations of the representations, the differential may be directly coupled to the planetary gear assembly without any intervening components positioned therebetween.

In any of the representations or combinations of the representations, the differential may be a locking differential configured to rotationally lock and unlock sections of the axle.

In any of the representations or combinations of the representations, where the axle may be a beam axle.

In any of the representations or combinations of the representations, the drive train may include multiple selectable gears upstream of the planetary gear assembly.

In any of the representations or combinations of the representations, the electric drive axle system may further comprise a clutch assembly configured to rotationally couple and decouple a gear set from the output shaft, where a sun gear in the first planetary gear assembly is configured to counteract at least a portion of an axial force acting on the clutch assembly when the clutch assembly is engaged.

In any of the representations or combinations of the representations, where the carrier may be directly coupled to a case of the differential.

In any of the representations or combinations of the representations, where an annulus in the planetary gear assembly may be held stationary during system operation.

In any of the representations or combinations of the representations, where the planetary gear assembly is offset on a lateral side of the electric motor-generator.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle system, comprising:
   a gear train configured to rotationally attach to an electric motor-generator, the gear train comprising:
      an output shaft rotationally coupled to a first planetary gear assembly axially offset from an input shaft rotationally coupled to the electric motor-generator, the first planetary gear assembly configured to removably attach to a differential arranged co-axial with an axle; and
   a clutch assembly configured to rotationally couple and decouple a gear set from the output shaft, where a sun gear in the first planetary gear assembly is configured to counteract at least a portion of an axial force acting on the clutch assembly when the clutch assembly is engaged.

2. The electric drive axle system of claim 1, where the first planetary gear assembly includes a first attachment interface coupled to a second attachment interface in the differential.

3. The electric drive axle system of claim 2, where the second attachment interface in the differential is configured to attach to a second planetary gear assembly and where the first planetary gear assembly has a different gear ratio than the second planetary gear assembly.

4. The electric drive axle system of claim 1, where the first planetary gear assembly includes a plurality of planet pins configured as datums to align a carrier in the first planetary gear assembly and a case of the differential.

5. The electric drive axle system of claim 4, where the plurality of planet pins extend axially through the carrier.

6. The electric drive axle system of claim 1, where the differential is directly coupled to the first planetary gear assembly without any intervening components positioned therebetween.

7. The electric drive axle system of claim 1, where the differential is a locking differential configured to rotationally lock and unlock sections of the axle.

8. The electric drive axle system of claim 1, where the axle is a beam axle.

9. An electric drive axle system, comprising:
   a gear train configured to rotationally attach to an electric motor-generator, the gear train comprising:
      an output shaft rotationally coupled to a first planetary gear assembly axially offset from an input shaft rotationally coupled to the electric motor-generator, the first planetary gear assembly configured to removably attach to a differential arranged co-axial with an axle;
      a clutch assembly configured to rotationally couple and decouple a gear set from the output shaft, where a sun gear in the first planetary gear assembly is configured to counteract at least a portion of an axial force acting on the clutch assembly when the clutch assembly is engaged; and
      a snap ring, a spring, and a thrust bearing coupled to the sun gear and a carrier in the first planetary gear assembly.

10. The electric drive axle system of claim 9, where, when the first planetary gear assembly is decoupled from the differential, the thrust bearing does not contact the carrier, and when the first planetary gear assembly is coupled to the differential, the thrust bearing contacts the carrier.

11. The electric drive axle system of claim 9, where the first planetary gear assembly includes a first attachment interface coupled to a second attachment interface in the differential.

12. The electric drive axle system of claim 11, where the first planetary gear assembly includes a plurality of planet pins configured as datums to align a carrier in the first planetary gear assembly and a case of the differential.

13. The electric drive axle system of claim 11, where the differential is directly coupled to the first planetary gear assembly without any intervening components positioned therebetween.

14. The electric drive axle system of claim 11, where the second attachment interface in the differential is configured to attach to a second planetary gear assembly and where the first planetary gear assembly has a different gear ratio than the second planetary gear assembly.

15. An electric drive axle system, comprising:
   a gear train configured to rotationally attach to an electric motor-generator, the gear train comprising:
      an input shaft rotationally coupled to the electric motor-generator and an output shaft rotationally coupled to a differential, where the input shaft is axially offset from the output shaft; and
   a clutch assembly configured to rotationally couple and decouple a gear set from the output shaft, where a sun gear in a first planetary gear assembly is configured to counteract at least a portion of an axial force acting on the clutch assembly when the clutch assembly is engaged;
   where the differential is configured to attach to the first planetary gear assembly and a second planetary gear assembly having a different gear ratio than the first planetary gear assembly.

16. The electric drive axle system of claim 15, where the differential includes an attachment interface configured to couple to an attachment interface in the first planetary gear assembly and an attachment interface in a second planetary gear assembly having a different gear ratio than the first planetary gear assembly.

17. The electric drive axle system of claim 15, where the first planetary gear assembly includes a plurality of planet pins extending axially through a carrier and into recesses in a differential case.

18. The electric drive axle system of claim 15, where the electric drive axle system includes a beam axle, the beam axle is arranged co-axial with the output shaft.

* * * * *